United States Patent
Imanishi et al.

(10) Patent No.: US 7,421,890 B2
(45) Date of Patent: Sep. 9, 2008

(54) TIRE HIL SIMULATOR

(75) Inventors: Etsujiro Imanishi, Kobe (JP); Koichi Honke, Kobe (JP); Akira Tsutsui, Kobe (JP); Naoki Sugano, Kobe (JP); Takao Nanjo, Kobe (JP); Yoshihiro Suda, Ota-ku (JP)

(73) Assignees: Kabushiki Kaisha Kobe Seiko Sho, Hyogo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 11/664,597

(22) PCT Filed: May 16, 2005

(86) PCT No.: PCT/JP2005/008883

§ 371 (c)(1),
(2), (4) Date: Apr. 4, 2007

(87) PCT Pub. No.: WO2006/040855

PCT Pub. Date: Apr. 20, 2006

(65) Prior Publication Data

US 2007/0256484 A1    Nov. 8, 2007

(30) Foreign Application Priority Data

Oct. 14, 2004  (JP) ............................ 2004-300512
Nov. 18, 2004  (JP) ............................ 2004-334999

(51) Int. Cl.
*G01M 17/02* (2006.01)

(52) U.S. Cl. ............................ 73/146; 701/71; 701/72; 702/140

(58) Field of Classification Search ........ 73/146–146.8; 340/442–447; 701/71, 72; 702/140
See application file for complete search history.

(56) References Cited

U.S. PATENT DOCUMENTS 5,641,900 A * 6/1997 Di Bernardo et al. ......... 73/146

(Continued)

FOREIGN PATENT DOCUMENTS

| JP | 57-091440 | 11/1980 |
| JP | 05-005677 | 6/1991 |
| JP | 10-002842 | 6/1996 |
| JP | 2003-118612 | 10/2001 |

OTHER PUBLICATIONS

International Search Report of PCT/JP2005/008883 mailed Aug. 9, 2005.

(Continued)

*Primary Examiner*—Andre J. Allen
*Assistant Examiner*—Jermaine Jenkins
(74) *Attorney, Agent, or Firm*—Reed Smith LLP; Stanley P. Fisher, Esq.; Juan Carlos A. Marquez, Esq.

(57) ABSTRACT

A tire HIL simulator is provided which is capable of, in a testing apparatus where a vehicle model is incorporated into a tire testing apparatus, reproducing the behavior of a tire which corresponds to the three-dimensional behavior of a vehicle, even if a three-dimensional vehicle model is used. As a device for resolving this, this tire HIL simulator includes a tire testing apparatus 2 and a controller 3 connected mutually. The tire testing apparatus 2 conducts a running test on a tire 4*a* using a mimic road surface body 4, and includes a side force measuring device 37 for measuring a tire side force and each actuator which gives a contact load, a side-slip angle and a camber angle, respectively. The controller 3 sets a steering angle and a tire side force from the side force measuring device 37 as an input value and calculates the three-dimensional motion of a vehicle using a vehicle model 5, and based on this calculation result, outputs each command value for the contact load, the side-slip angle and the camber angle to each actuator of the tire testing apparatus 2.

10 Claims, 20 Drawing Sheets

U.S. PATENT DOCUMENTS

| | | | | |
|---|---|---|---|---|
| 6,199,026 | B1 * | 3/2001 | Shiraishi et al. | 702/140 |
| 6,959,593 | B2 * | 11/2005 | Mancosu et al. | 73/146 |
| 7,066,018 | B2 * | 6/2006 | Miyamoto et al. | 73/146 |
| 7,140,242 | B1 * | 11/2006 | Poling et al. | 73/146 |
| 7,168,308 | B2 * | 1/2007 | Mancosu et al. | 73/146 |
| 7,197,380 | B2 * | 3/2007 | Fangeat et al. | 701/1 |
| 7,203,603 | B2 * | 4/2007 | Bertrand | 702/41 |
| 7,222,522 | B2 * | 5/2007 | Monguzzi et al. | 73/146 |
| 7,343,788 | B2 * | 3/2008 | Kishida et al. | 73/146 |

OTHER PUBLICATIONS

Masao Nagai et al., "A Study on Handling and Stability Using Tire Hardware-In-the-Loop Simulator (First Report)—Development of Tire HILS", Transactions of the Society of Automotive Engineers of Japan, vol. 35, No. 2, Apr. 2004, pp. 147-152.

Nuksit Noomwongs et al., "A Study on Handling and Stability Using Tire Hardware-In-the-Loop Simulator (Second Report)—Influence of Suspension and Steering System", Transactions of the Society of Automotive Engineers of Japan, vol. 35, No. 2, Apr. 2004, pp. 153-158.

Kazuyuki Kobayashi et al., "A Simple Vehicle Dynamics Modeling by the Object Oriented Approach", Transactions of the Society of Instrument and Control Engineers, vol. 34, No. 11, 1998, pp. 1616-1624.

* cited by examiner

TIRE HIL SIMULATOR

TECHNICAL FIELD

The present invention relates to a tire HIL (or Hardware-In-the-Loop) simulator which is capable of conducting a test under conditions close to real running test conditions for a vehicle.

BACKGROUND ART

In development of an automobile or the like case, optimizing a tire suspension system needs to be taken into account. In this case, a large number of conditions must be set, such as a tire's surface temperature, internal pressure and contact load, and further, the tire's material and shape. It takes a great deal of test time to set their optimum conditions. Besides, the effect of the mechanism or compliance of a suspension on a tire's performance needs to be examined. Therefore, in a computerized simulation, a complicated tire model is difficult to be used as it is when considering the optimization. On the other hand, in the case of a real running test, actual tire characteristics can be directly obtained, but it is difficult to reproduce a road surface condition or the like for the purpose of the optimization.

Therefore, instead of a real running test, various tire testing apparatus have been proposed.

For example, in Patent Document 1, a testing apparatus is given which is capable of measuring the characteristics of a tire itself which appear at a running time. However, in the testing apparatus of Patent Document 1, the characteristics of a vehicle are left out of account.

In addition, in a unit described in Patent Document 2, in order to reproduce the behavior of a suspension, an attempt is made to approach a real running-test state by giving a tire a force equivalent to a tire-holding force from an arithmetic unit. However, in the testing apparatus of Patent Document 2, a fluctuation in the tire's side force changes the behavior of the vehicle including the suspension. This makes it hard to reproduce the real running state truly.

On the other hand, in a testing apparatus described in Patent Document 3, a simulation model which reproduces a vehicle model is incorporated into the corresponding unit. This is aimed at coming closer to a real running-test state. However, in the testing apparatus of Patent Document 3, the simulation model includes a tire model. Hence, in order to optimize the characteristics of a tire, another tire model needs creating anew, thus taking time and labor.

Therefore, as a unit which is capable of resolving the above described disadvantages, an HIL simulator is proposed (refer to Non-Patent Document 1). In this unit, a vehicle model corresponding to a simulation model using software is connected via an interface to a tire testing apparatus having a real tire as hardware. This tire HIL simulator is configured as a unit which has a real tire as hardware, without using a complex tire model as software. Hence, a test can be conducted under the conditions close to real running conditions.

Patent Document 1: Japanese Patent Laid-Open Publication No. 57-91440

Patent Document 2: Japanese Patent Laid-Open Publication No. 5-5677

Patent Document 3: Japanese Patent Laid-Open Publication No. 10-2842

Non-Patent Document 1: "134 Study on Handling and Stability by Using Tire HIL Simulator (Part 1)", Academic Lecture Preprint Collection No. 101-02 (pp. 14-19) "2002593" by Society of Automotive Engineers of Japan, Inc.

DISCLOSURE OF THE INVENTION

In the tire HIL simulator described in Non-patent Document 1, the vehicle model is an equivalent two-wheel model. Hence, only a mechanism is provided to control a tire's rotation, a tire side-slip angle and a tire contact load as the tire's behavior. This raises a disadvantage that a tire's camber angle based on a rolling angle of the vehicle generated when the vehicle model is three-dimensionally considered cannot be reproduced in a testing apparatus.

In view of the above described disadvantages, it is an object of the present invention to provide a testing apparatus which is incorporated with a vehicle model and can reproduce the behavior of a tire which corresponds to a three-dimensional behavior of a vehicle even if a three-dimensional vehicle model is used.

In addition, it is another object to realize a virtual running test using an actual object as the part of a tire by combining a running simulator.

In order to attain the above described objects, the present invention has the following construction. Specifically, a tire HIL simulator according to the present invention includes: a tire testing apparatus which allows a real tire to come into contact with a mimic road surface body to conduct a running test of the tire; and a controller which has a vehicle model, and obtains measurement data from the tire testing apparatus as an input value and makes a predetermined calculation using the vehicle model, and outputs a command value based on a result of the calculation to an actuator of the tire testing apparatus. The tire testing apparatus has: a side force measuring device for measuring a tire side force applied to the tire; and actuators for imparting a contact load, a side-slip angle and a camber angle for the tire, respectively. The controller obtains a steering angle and a tire side force from the side force measuring device as an input value, and calculates a three-dimensional motion of a vehicle using the vehicle model, and outputs command values as a contact load, a side-slip angle, and a camber angle to the respective actuators based on a result of the calculation.

According to the present invention, a tire side force is a force Fy shown in FIG. 18 and FIG. 19. Similarly, a contact load is a force Fz shown in FIG. 18; a camber angle is an angle α shown in FIG. 18; a side-slip angle is an angle β shown in FIG. 19.

According to the present invention, performance characteristics of a real tire attached to the tire testing apparatus can be measured. Measurement data (i.e., the tire side force) and a steering angle are inputted in the vehicle model as an input value to thereby calculate, using the vehicle model, motion characteristics (i.e., contact load, side-slip angle and camber angle) of a vehicle in real time. Values obtained in this calculation are outputted as command values to actuators of the tire testing apparatus to thereby operate these actuators. In this way, the supporting state of the tire on the mimic road surface body can be controlled.

As described above, according to the present invention, performance characteristics of a real tire can be inputted in the vehicle model, and the motion characteristics of the vehicle that are obtained using the vehicle model affected by the inputted tire performance characteristics can be given, via each actuator, again to the real tire of the tire testing apparatus. This makes it possible to exchange information between the tire testing apparatus and the controller in real time to thereby realize a simulation which is extremely approximate to a real running-test state.

As described so far, according to the present invention, a tire test can be conducted under conditions nearer to the real running-test conditions.

BEST MODE FOR IMPLEMENTING THE INVENTION

Figure 1A:
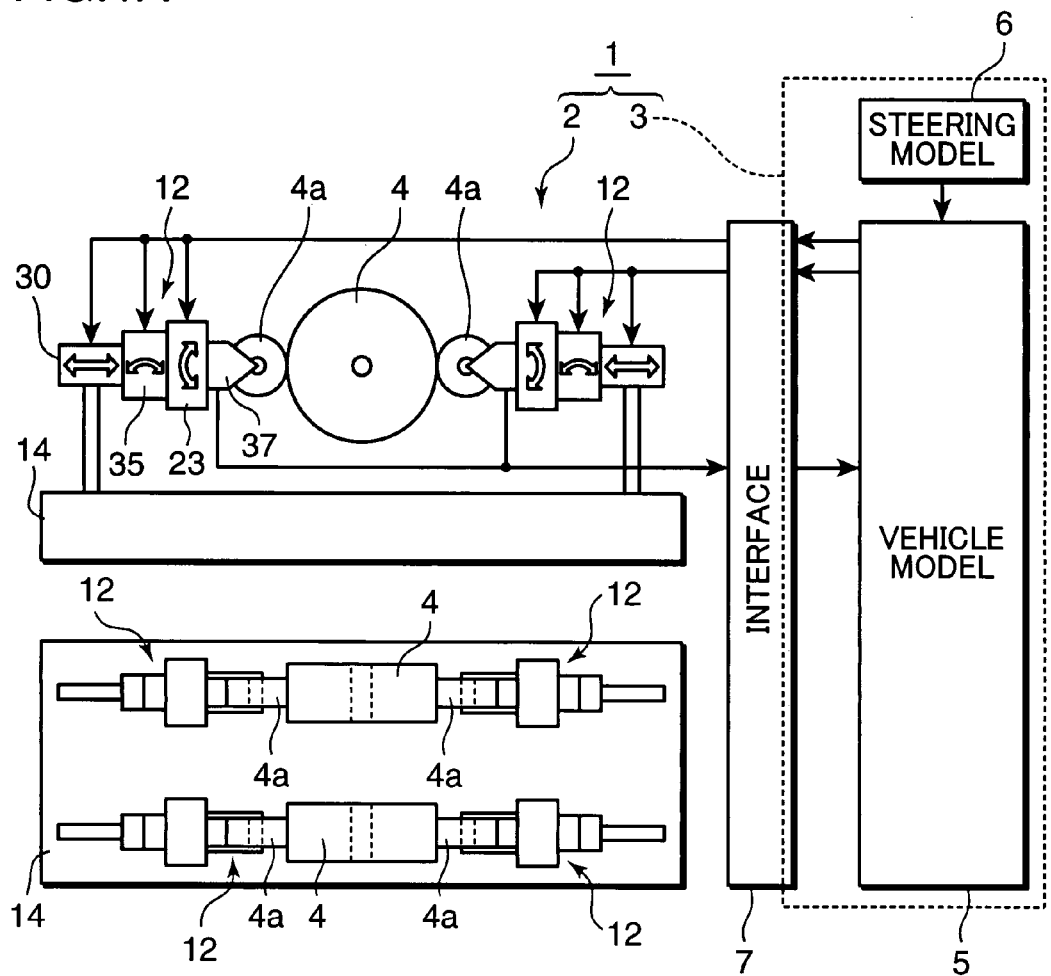
FIG. 1A is a schematic view of a tire HIL simulator according to a first embodiment of the present invention, showing its system configuration.

Hereinafter, embodiments of the present invention will be described with reference to the drawings. FIG. 1A is a schematic view of a tire HIL simulator according to an embodiment of the present invention, showing its system configuration. A tire HIL simulator 1 according to the present invention includes a tire testing apparatus 2, and a controller 3 in which measurement data of the tire testing apparatus 2 is inputted. This controller 3 controls the tire testing apparatus 2.

In FIG. 1A, the tire testing apparatus 2 is drawn in a left area of this figure. In an upper portion of this area, a front view of the tire testing apparatus 2 is shown, and a plan view of the testing apparatus 2 is shown in a lower portion (hereinafter, the same is in FIG. 9, FIG. 11, FIG. 13, FIG. 15, FIG. 16 and FIG. 17).

Also, the tire testing apparatus 2 shown in the figure is configured for a four-wheel vehicle as a premise. However, the number of wheels of a targeted vehicle is not limited to this, and thus, the present invention can also be applied to a vehicle having two, three, six, or eight wheels, or the like.

The tire testing apparatus 2 allows a real tire 4a to come into contact with a mimic road surface body 4. Thereby, it gives a running test to this tire 4a. The controller 3 includes a vehicle model 5, and receives measurement data of the tire testing apparatus 2 as an input value and conducts a predetermined calculation based on the vehicle model 5. On the basis of the result of this calculation, the controller 3 outputs a command value to an actuator of the tire testing apparatus 2. The vehicle model 5 is designed as a computer software.

In this embodiment, a steering mechanism is not written in the vehicle model 5, and thus, separately from this vehicle model 5, a steering model 6 having a steering mechanism written therein is incorporated in the controller 3. However, the steering model 6 may also be united with the vehicle model 5.

The software of the controller 3 including the vehicle model 5 is connected via an interface 7 to the hardware constituted by the tire testing apparatus 2.

Figure 2:
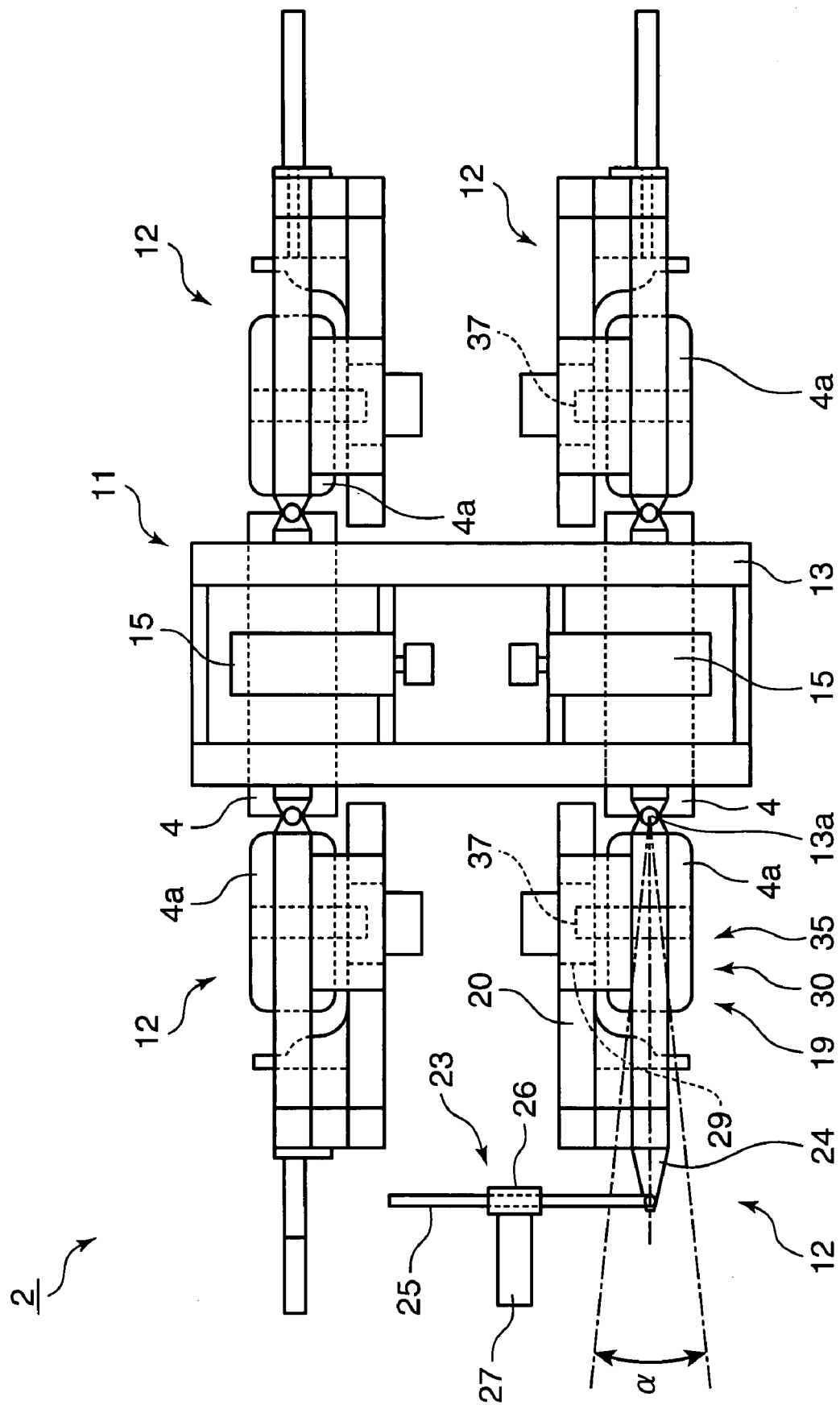
FIG. 2 is a plan view of a tire testing apparatus of the tire HIL simulator.
Figure 3:
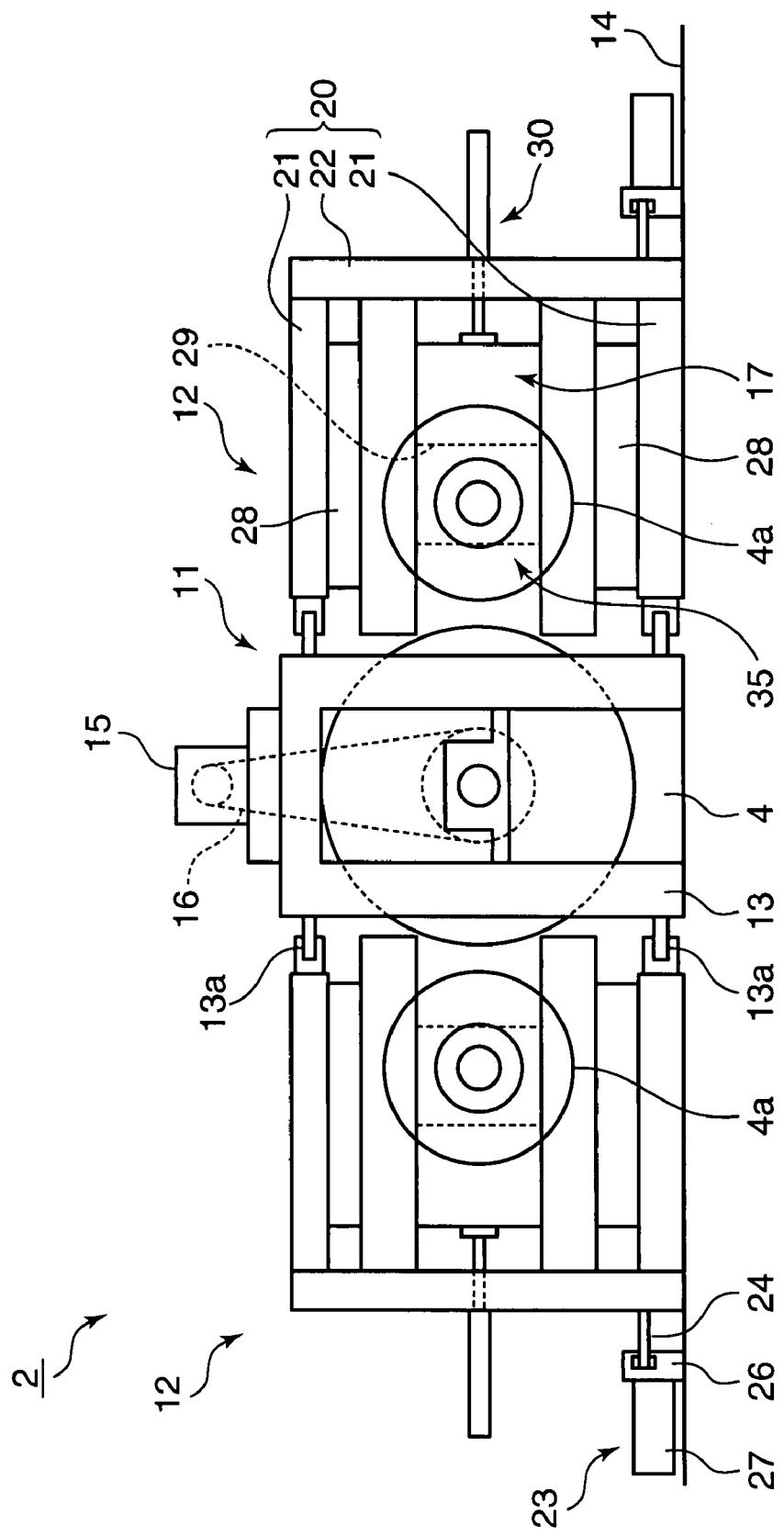
FIG. 3 is a front view of the tire testing apparatus.

FIG. 2 and FIG. 3 show an example of the tire testing apparatus 2. The main part of the tire testing apparatus 2 is constructed by a mimic road surface portion 11 including the mimic road surface body 4, and a tire attachment portion 12 to which the tire 4a is attached.

The mimic road surface portion 11 includes a main frame 13, and the main frame 13 has four pillars standing on a platform base 14, and lateral bridge members linking these pillars together. The mimic road surface body 4 is supported on the main frame.

In this embodiment, the mimic road surface body 4 is constituted by a steel drum having a cylindrical peripheral surface. The tire 4a comes into contact with the peripheral surface, and in this state, a running test is conducted. However, in the present invention, the specific structure of the mimic road surface body 4 is not limited to this. For example, as is described in Japanese Patent Laid-Open Publication No. 2002-39919, an endless belt may also be used for the mimic road surface body 4.

The mimic road surface body 4 includes a main drum having the cylindrical peripheral surface, a pair of disk plates provided at the axial ends of the main drum, and a shaft member penetrating the center of these disk plates. The shaft member is rotatably supported on the main frame 13 in a horizontal state, so that the peripheral surface of the mimic road surface body 4 rotates in a direction along a vertical plane about the shaft member as its central axis.

In this embodiment, two mimic road surface bodies 4 are placed on the main frame 13. These mimic road surface bodies 4, 4 have the same shape and size as each other. Both mimic road surface bodies 4, 4 are disposed on the same horizontal axial line.

Above the main frame 13, there is provided a drive unit 15 for rotating the mimic road surface body 4. In this embodiment, two such drive units 15 are placed on the main frame 13. Each drive unit 15 includes an electric motor. The output shaft of each electric motor of these drive units 15 is linked via a winding drive transmission 16 to the shaft member of the mimic road surface body 4 to thereby rotate the output shaft of the electric motor of the drive unit 15 and the mimic road surface body 4 interlockingly.

Two tire attachment portions 12 are respectively provided on both right and left sides of the mimic road surface bodies 4, in other words, on both sides with respect to the direction perpendicular to the direction of the rotational axes. Hence, the tire testing apparatus 2 shown in the figure includes four tire attachment portions 12 in total. As shown in FIG. 1A, the four tire attachment portions 12 are connected via the interface 7 to the controller 3. In this way, each of the tires 4a attached to the four tire attachment portions 12 is set as one of the front right, front left, rear right, and rear left tires of the vehicle model 5 in the controller 3.

Specifically, in the apparatus shown in the figure, the tires 4a, 4a of the two tire attachment portions 12 which are disposed on one side of the pair of mimic road surface bodies 4, 4 side by side are set as the pair of front right and front left tires of the vehicle model 5, respectively. On the other hand, the tires 4a, 4a of the two tire attachment portions 12 which are disposed on the other side of the pair of mimic road surface bodies 4, 4 are set as the pair of rear right and rear left tires of the vehicle model 5, respectively.

These tire attachment portions 12 each have the same structure. The tire 4a is attached to each tire attachment portion 12 so as to rotate about a rotational axis parallel to the axis of the mimic road surface body 4.

The tire attachment portion 12 is provided with a vertical load impartation device 17, a side-slip angle impartation device 18 and a camber angle impartation device 19. The vertical load impartation device 17 presses the peripheral surface of the tire 4a onto the peripheral surface of the drum along a horizontal line passing the center of the mimic road surface body 4 controlledly. The side-slip angle impartation device 18 and the camber angle impartation device 19 give the tire 4a a side-slip angle and a camber angle, respectively.

Figure 4:
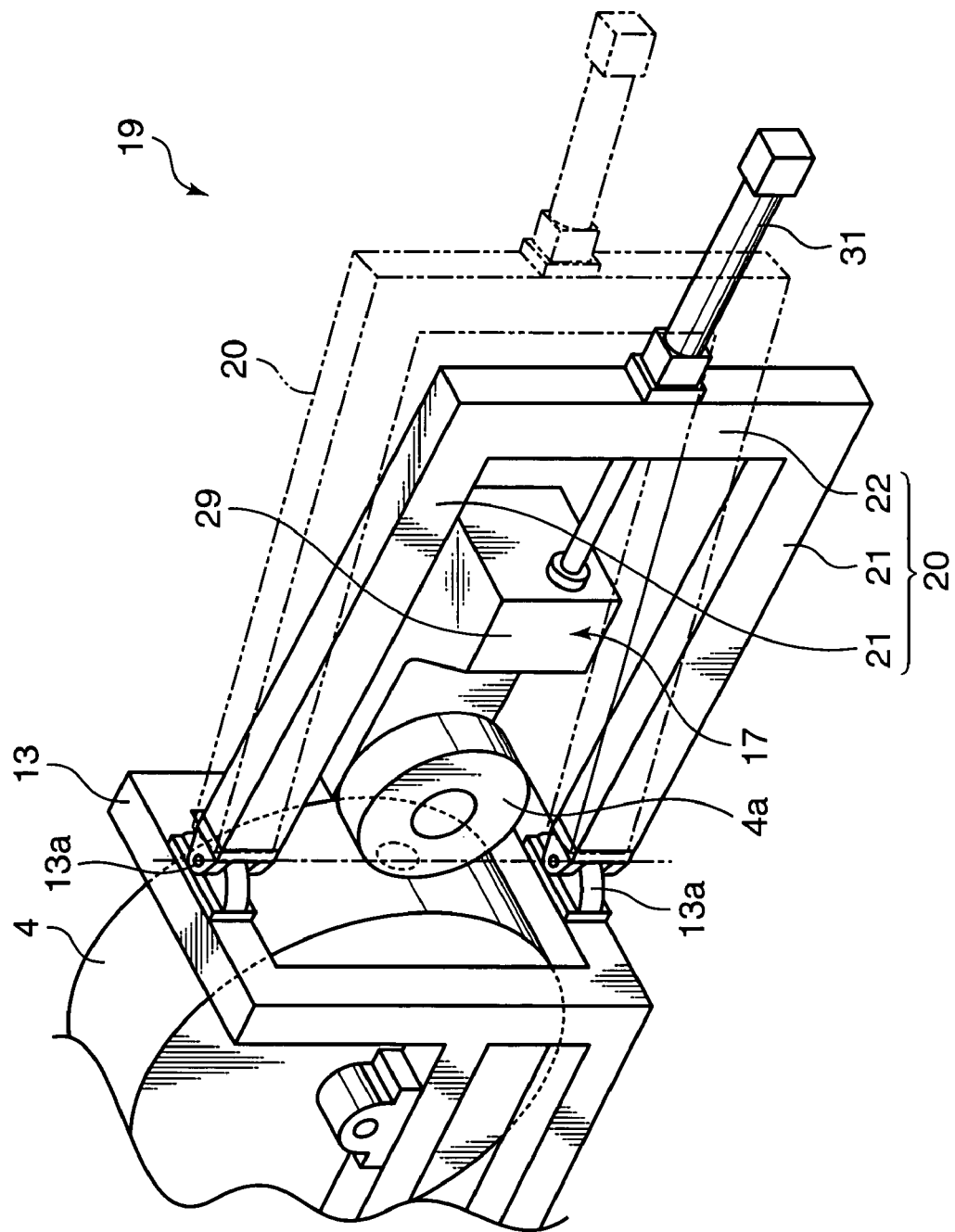
FIG. 4 is a perspective view of a camber angle impartation device at a tire attachment portion in the tire testing apparatus, showing its configuration.

As shown in FIG. 2 to FIG. 4, the camber angle impartation device 19 includes a swing frame (swing member) 20. The swing frame 20 is connected via hinges 13a to the main frame 13 pivotally about a vertical axis. A swing angle α of the swing frame 20 about the vertical axis corresponds to a camber angle.

The swing frame 20 includes a pair of upper and lower lateral frames 21, 21 which are mounted on the main frame 13 pivotally around the vertical axis, and a vertical frame 22 interconnecting the free ends of the pair of upper and lower lateral frames 21, 21. The pivotal centers of the pair of upper and lower lateral frames 21, 21 are on the same vertical axis, and this vertical axis comes into tangential contact with peripheral surface of the drum of the mimic road surface body 4.

The swing frame 20 is connected with a camber angle impartation actuator 23 to be thereby swung by this actuator 23. Specifically, as shown in FIG. 2 and FIG. 3, an arm 24 is provided on the vertical frame 22 of the swing frame 20. The arm 24 is connected with the camber angle impartation actuator 23.

The camber angle impartation actuator 23 includes a screw shaft 25 linked to the arm 24, a feeding device 26 which is provided on the platform base 14 and rotatably holds a nut meshing the screw shaft 25, and an electric servo motor 27 for rotating the nut of the feeding device 26. This servo motor 27 is connected, as shown in FIG. 1A, via the interface 7, to the vehicle model 5 of the controller 3. A command value from the controller 3 is inputted to the camber angle impartation actuator 23. In accordance with the command value, the electric servo motor 27 shown in FIG. 2 rotates the nut of the feeding device 26 to thereby feed the screw shaft 25 in the axial direction so that the swing frame 20 swings about the vertical axis and the tire 4a inclines a swing angle α with respect to the mimic road surface body 4. In this way, the angle α, that is, the camber angle, is controlled within a predetermined range.

The camber angle impartation device 19 is not limited to the one shown in the figure, and also means for swinging the swing frame 20 is not limited to the specific one. For example, such a swing frame may also be swung by a hydraulic servo motor, a hydraulic cylinder or the like. As described in Japanese Patent Laid-Open Publication No. 5-52711, it may be appreciated to adopt a way of driving a pinion engaging with an arc-shaped rack.

As shown in FIG. 4, the contact load impartation device 17 is disposed inside of the swing frame 20 of the camber angle impartation device 19, and supported on the frame 20. This contact load impartation device 17 includes a slider 29 and a contact load impartation actuator 30.

Figure 5:
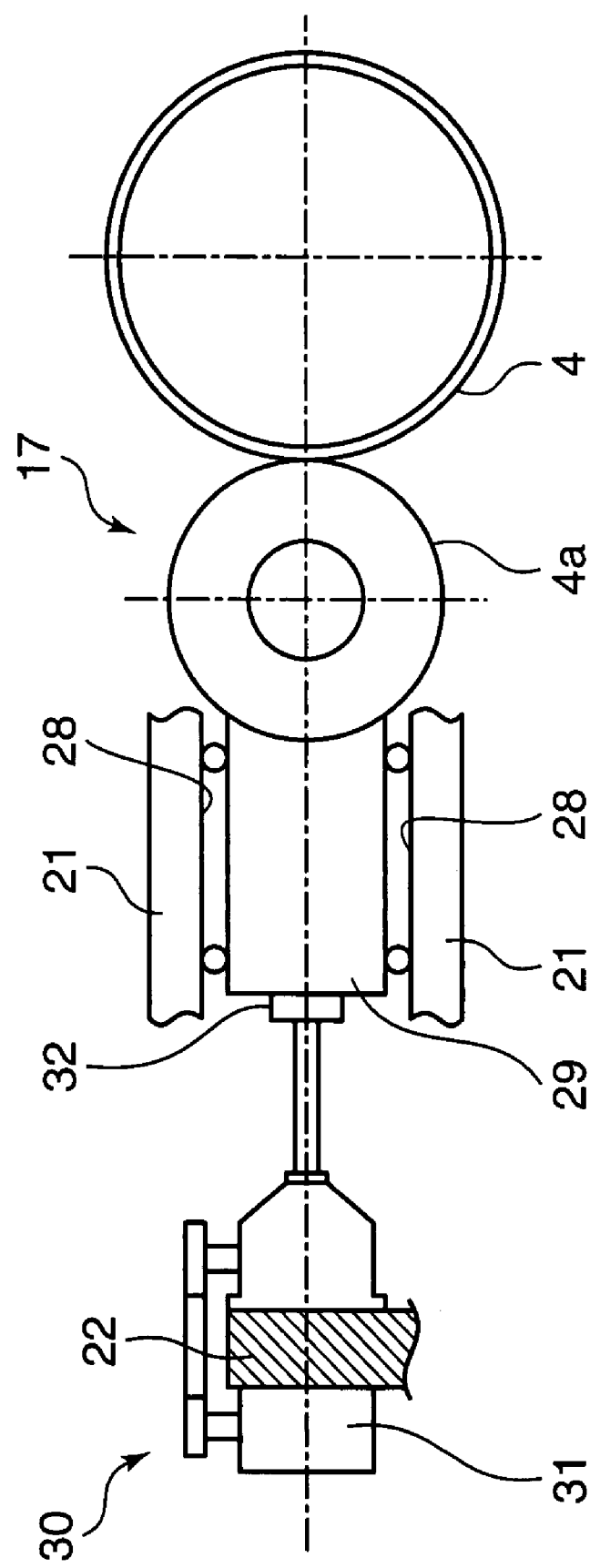
FIG. 5 is a schematic view of a vertical load impartation device at the tire attachment portion, showing its configuration.

The slider 29 is slidably supported, as shown in FIG. 5, on a pair of upper and lower guide rails 28, 28 which is provided on the pair of upper and lower lateral frames 21, 21 of the swing frame 20. Thereby, the slider 29 can slide in directions of moving to and away from the mimic road surface body 4. The contact load impartation actuator 30 slides the slider 29 along the guide rails 28 and 28 so as to move to and away from the peripheral surface of the mimic road surface body 4.

The contact load impartation actuator 30 in this embodiment includes a screw jack 31 fixedly attached to the vertical frame 22 of the swing frame 20, and a motor (not shown) incorporated in the screw jack 31. An operation of the screw jack 31 causes the slider 29 to slide along the guide rails 28 and 28. A load cell 32 is provided on the slider 29 to detect a pressing load which the tire 4a is pressed onto the mimic road surface body 4 by the slide of the slider 29, that is, a tire contact load.

The contact load impartation actuator 30 is connected, as shown in FIG. 1A, via the interface 7 to the vehicle model 5 of the controller 3. On the basis of measurement data by the load cell 32, the controller 3 derives a command value using the vehicle model 5, and inputs this command value in the contact load impartation actuator 30. The screw jack 31 of the contact load impartation actuator 30 is operated in accordance with the command value to thereby move the slider 29 to the mimic road surface body 4. In this way, the contact load of the tire 4a is controlled.

The contact load impartation device 17 is not limited to the above described configuration. For example, it may also be the one which uses a hydraulic cylinder or the like. Besides, as is described in Japanese Patent Laid-Open Publication No. 3-67148 or Japanese Patent Publication No. 1-15809, it may be appreciated to adopt a way of moving the drum.

Figure 6:
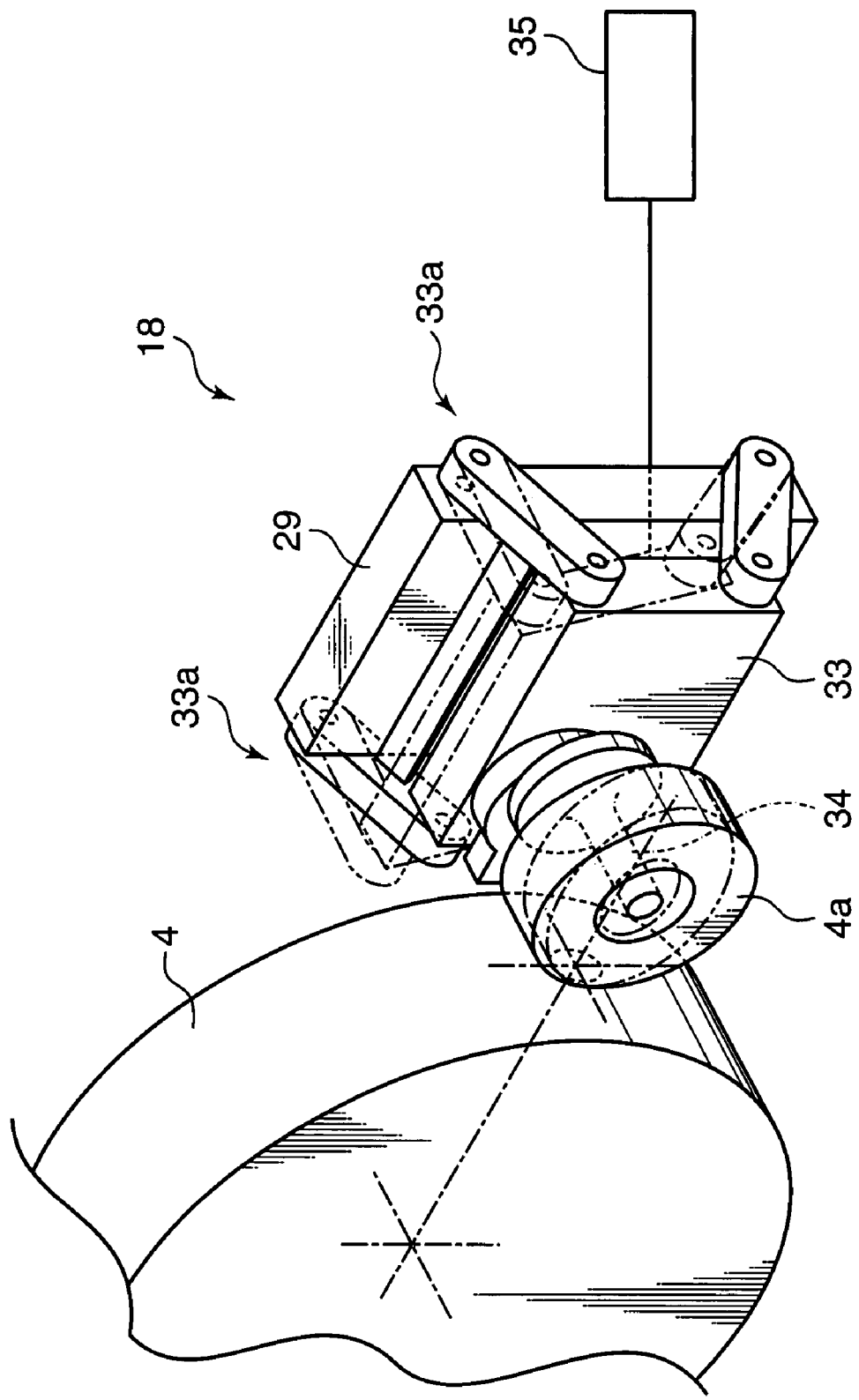
FIG. 6 is a perspective view of a side-slip angle impartation device at the tire attachment portion, showing its main part.

The side-slip angle impartation device 18 is provided, as shown in FIG. 6, on the slider 29 of the contact load impartation device 1, and includes a base member 33 which is incliningly linked via a pair of right and left link mechanisms 33a, 33a to the slider 29, and a side-slip angle impartation actuator 35 for inclining the base member 33.

The base member 33 is mounted with a tire attachment shaft 34 on a surface thereof. A tire 4a is rotatably attached on a leading end of the tire attachment shaft 34 by connecting the axle of the tire 4a to the leading end by fastening means, such as a bolt. The tire 4a can be easily removed from the tire attachment shaft 34 by releasing the fastening means. This makes it possible to easily conduct replacement of a tire 4a to the tire attachment portion 12.

The side-slip angle impartation actuator 35 includes a screw jack and a motor for rotating the screw jack. The screw jack is connected to the base member 33. An operation of the motor inclines the base member 33.

The side-slip angle impartation actuator 35 is connected via the interface 7 to the vehicle model 5 of the controller 3. The side-slip angle impartation actuator 35 receives a command value calculated in accordance with the vehicle model 5 to thereby incline the base member 33 an angle corresponding to this command value. Consequently, the axle of the tire attachment shaft 34 inclines in an up-and-down direction from the horizontal state. In this way, the side-slip angle of the tire 4a is controlled.

The side-slip angle impartation device 18 is not limited to the above described configuration. For example, the configuration described in Japanese Patent Publication No. 62-8739 may be adopted.

As shown in FIG. 2, a side-force measuring device 37 is provided in each tire attachment portion 12 of the tire testing apparatus 2 to measure a side-force applied to the tire 4a. Each side-force measuring device 37 is connected to a slider-side end of the tire attachment shaft 34. These side-force measuring devices 37 are connected, as shown in FIG. 1A, via the interface 7 to the vehicle model 5. A tire side-force measured by the side-force measuring device 37 is inputted in the vehicle model 5 to thereby calculate a dynamic behavior of the vehicle in the case that the tire side-force of the real tire 4a is given to the vehicle model 5.

Figure 7:
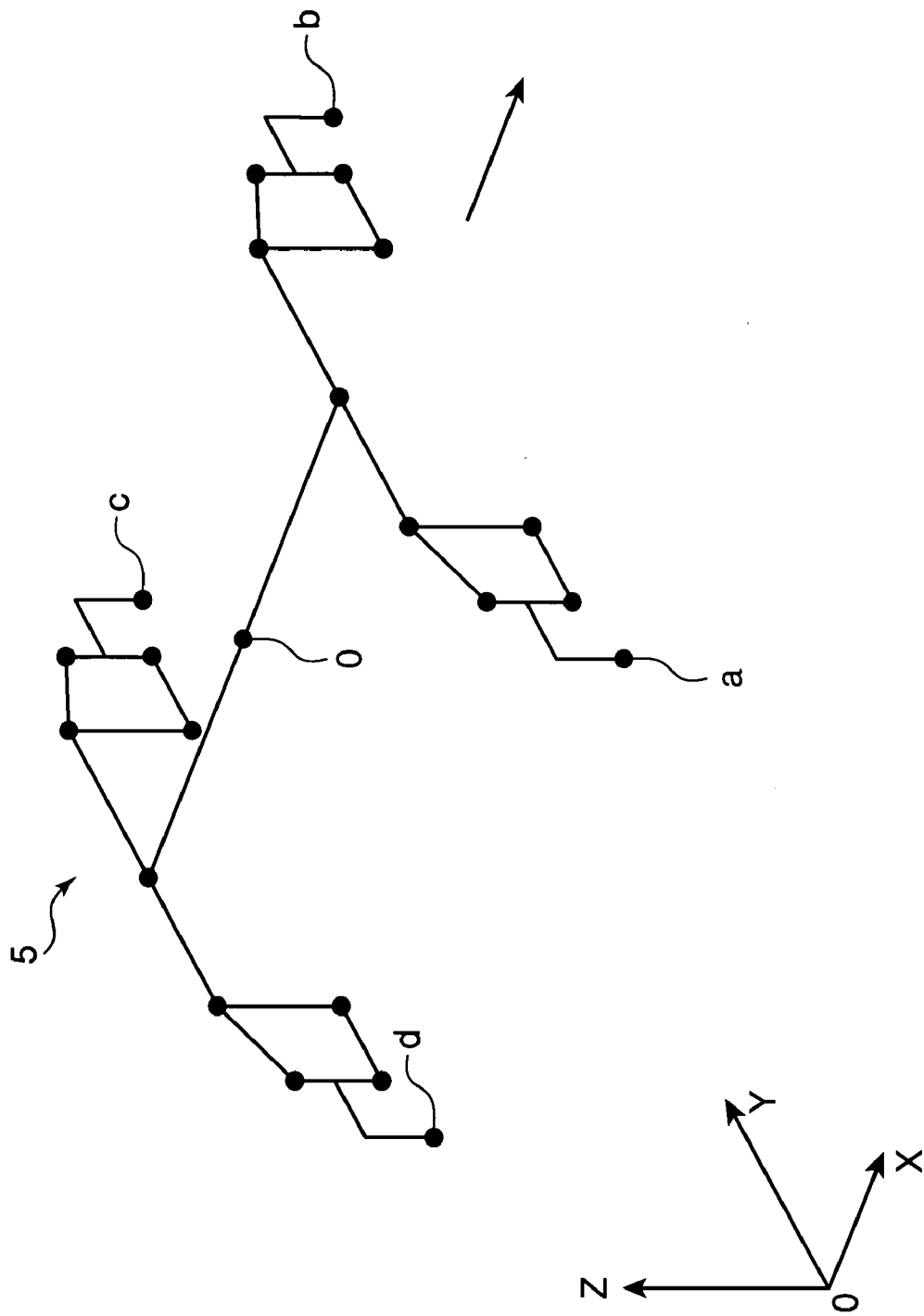
FIG. 7 is an illustration showing an image of a vehicle model used in the tire HIL simulator.

FIG. 7 is an illustration schematically showing the vehicle model 5 used in this embodiment. As shown in the figure, this vehicle model 5 is a three-dimensional model in which a vehicle body and suspension mechanisms is defined by using beam elements or truss elements of a finite element method. The vehicle model 5 takes into account the rigidity of the vehicle body and the geometric non-linearity of the suspension mechanism. In this vehicle model 5, each nodal point has a freedom degree of six. These nodal points are each joined by a beam element in consideration of a large rotation in a finite element method. Hence, in addition of the vehicle's motion in up-and-down directions, right-and-left directions and front-and-rear directions, the vehicle model 5 can consider a rotation in pitching directions, rolling directions and yawing directions. This makes it possible to express the vehicle's three-dimensional motion entirely.

The vehicle model 5 shown in FIG. 7 is a model of the wishbone-type suspension, and the spring strength and attenuation power of the suspension are expressed as characteristics of a beam element (for details, refer to a document: No. 685 (2003-9), vol. 69, a collection of research papers (Series C) by The Japan Society of Mechanical Engineers). In this embodiment, as conceptually shown in FIG. 1B, a steering angle set using the steering model 6 and a tire side force measured by the side-force measuring device 37 are sent to the vehicle model 5 as input values to thereby calculate a three-dimensional motion of the vehicle. Based on the result of this calculation, a contact load, a side-slip angle and a camber angle are derived, and then outputted to each of the above-mentioned actuators as command values to thereby control the contact load, side-slip angle and camber angle to be applied to each tire 4a. In this way, a state which approximates to a real running state is reproduced.

Hereinafter, a description will be given about the process of deriving a side-slip angle given to each tire 4a using the vehicle model 5.

Figure 20:
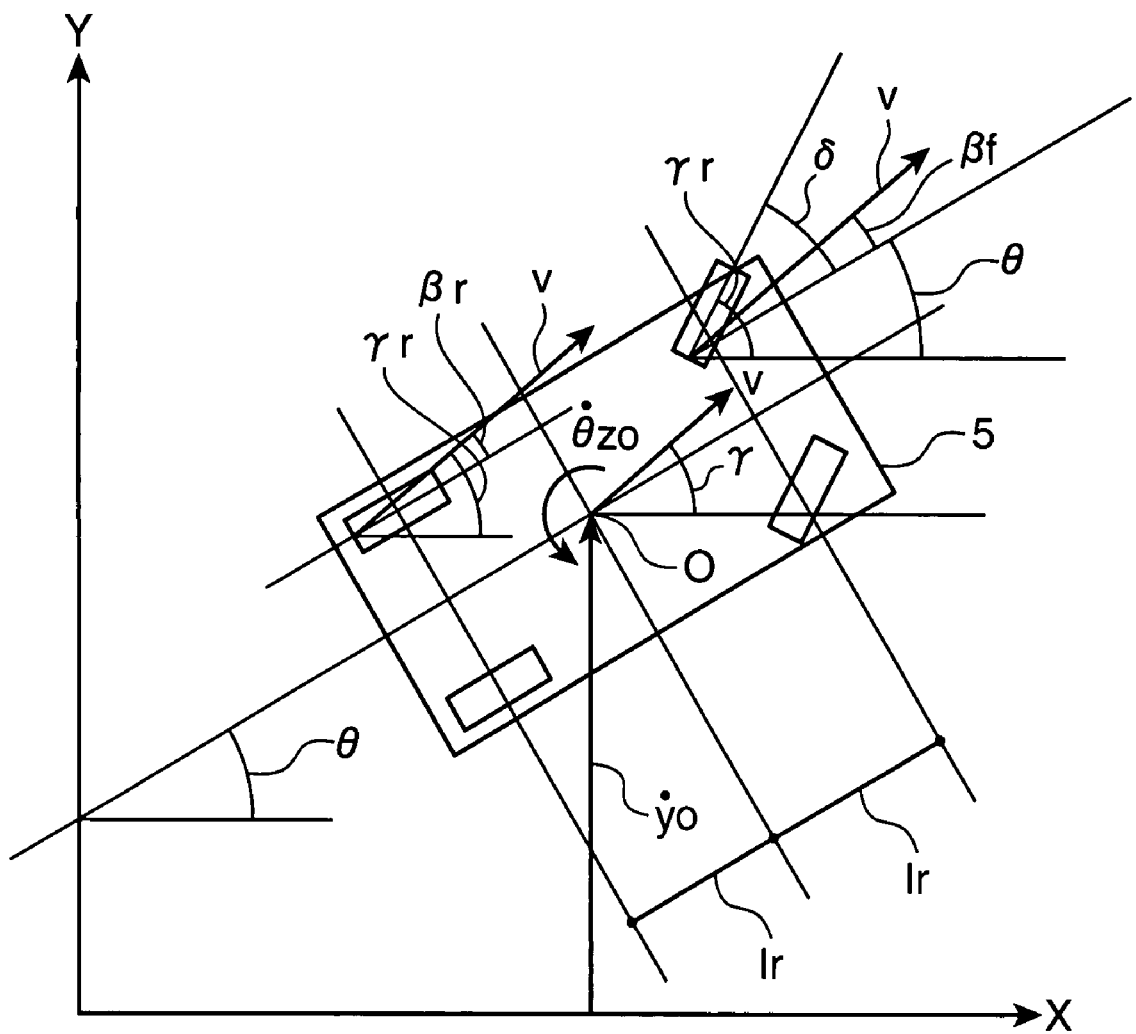
FIG. 20 is an illustration explaining the definition of terms used in the present invention.

In this embodiment, if a steering angle δ is inputted from the steering model 6 in the vehicle model 5 which has a running speed V, as shown in FIG. 20, an angle γf at which the front wheel of the vehicle model 5 meets the X-axis is obtained from the following Equation (1). On the other hand, an angle γr at which the rear wheel meets the X-axis is obtained from the following Equation (2).

[Number 1]

$$\gamma_f = \frac{1}{V}\dot{y}_o + \frac{1_f}{V}\dot{\theta}_{zo} \quad (1)$$

[Number 2]

$$\gamma_r = \frac{1}{V}\dot{y}_o - \frac{1_r}{V}\dot{\theta}_{zo} \quad (2)$$

Wherein, V denotes a vehicle speed; lf denotes a distance between the gravity center O and the axis of the rotational shaft of the front wheel; and lr denotes a distance between the gravity center O and the axis of the rotational shaft of the rear wheel. Besides, an angle θf at which the orientation line of the front wheel intersects the X-axis is obtained from the following Equation (3). An angle θr at which the orientation line of the rear wheel intersects the X-axis is obtained from the following Equation (4).

[Number 3]

$$\theta_f = \theta_{zo} + \delta \quad (3)$$

[Number 4]

$$\theta_r = \theta_{zo} \quad (4)$$

Wherein, θzo denotes an angle at which a shifting direction of the gravity center O meets the X-axis and which is equal to an angle θ in FIG. 20. A side-slip angle βf of the front wheel is derived from the following Equation (5) while a side-slip angle βr of the rear wheel is derived from the following Equation (6).

[Number 5]

$$\beta_f = \gamma_f - \theta_f = \frac{1}{V}\dot{y}_o + \frac{1_f}{V}\dot{\theta}_{zo} - \theta_{zo} - \delta \quad (5)$$

[Number 6]

$$\beta_r = \gamma_r - \theta_r = \frac{1}{V}\dot{y}_o - \frac{1_r}{V}\dot{\theta}_{zo} - \theta_{zo} \quad (6)$$

Figure 1B:
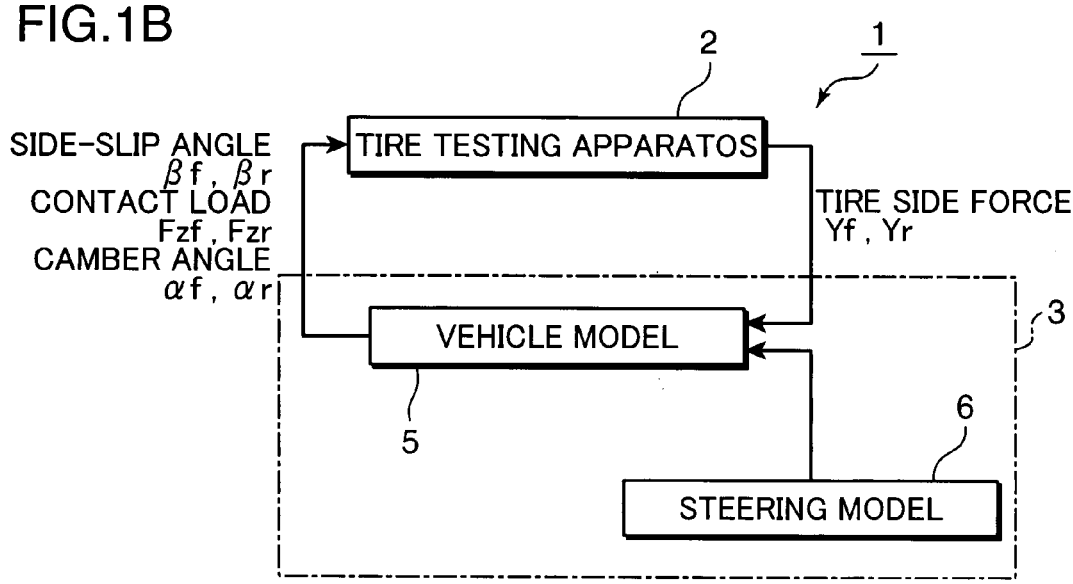
FIG. 1B is a block diagram showing the system of the tire HIL simulator.

These side-slip angles βf, βr of the front wheel and the rear wheel are calculated by a computer using the vehicle model 5. These side-slip angles βf, βr are inputted as command values in the side-slip angle impartation actuator 35 of each tire attachment portion 12 to give the side-slip angle to each tire 4a. Similarly, as shown in FIG. 1B, the steering angle δ and tire side-forces Yf, Yr of each tire 4a measured by the side-force measuring device 37 are inputted in the vehicle model 5. Thus, from the vehicle model 5, a contact load Fzf and a camber angle αf of the front wheel as well as a contact load Fzr and a camber angle αr of the rear wheel are derived based on these input values. These contact loads Fzf, Fzr and camber angles αf, αr are inputted as command values in the contact load impartation actuator 30 and the camber angle impartation actuator 23 of each tire attachment portion 12 to thereby give the contact loads and the camber angles to each tire 4a.

Through the above-described operations, not only a rotational motion in the yawing direction which is derived from the vehicle model 5 but also a rotational motion in the rolling direction which is affected by the modeled suspension mechanism can be given to the four real tires 4a. This makes it possible to measure the characteristic performances of the tire in these motions.

In this way, in this embodiment, the characteristic performances of the real tire 4a can be inputted in the vehicle model 5, and the vehicle motion characteristics of the vehicle model 5 which has been affected by these inputted tire performance characteristics can be given, via each actuator, again to the real tire 4a of the tire testing apparatus 2. In this way, the mutual exchange of information between the tire testing apparatus 2 and the controller 3 can realize a simulation which extremely approximate to the real running test state.

Figure 8:
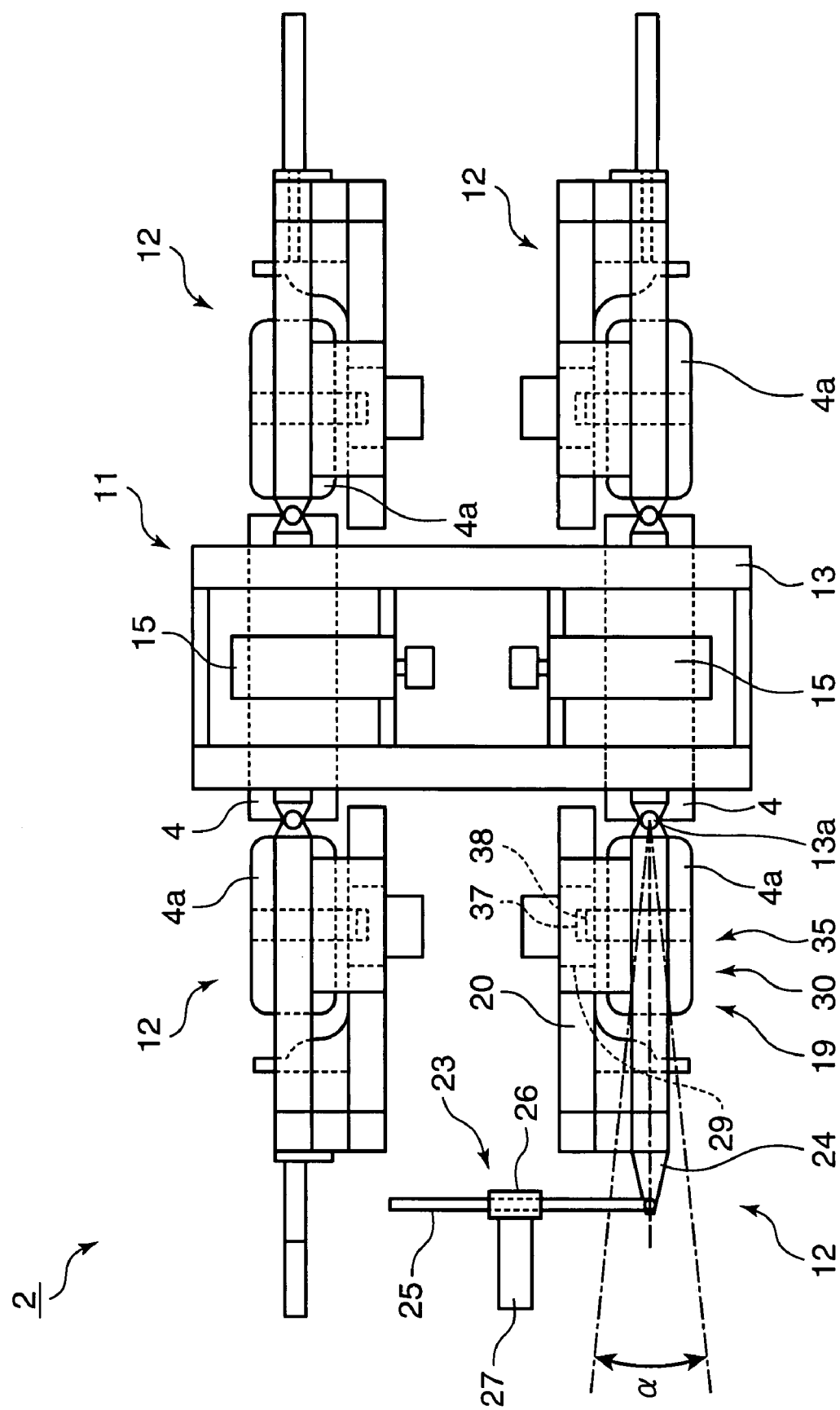
FIG. 8 is a plan view of a tire testing apparatus of a tire HIL simulator according to a second embodiment of the present invention.
Figure 9:
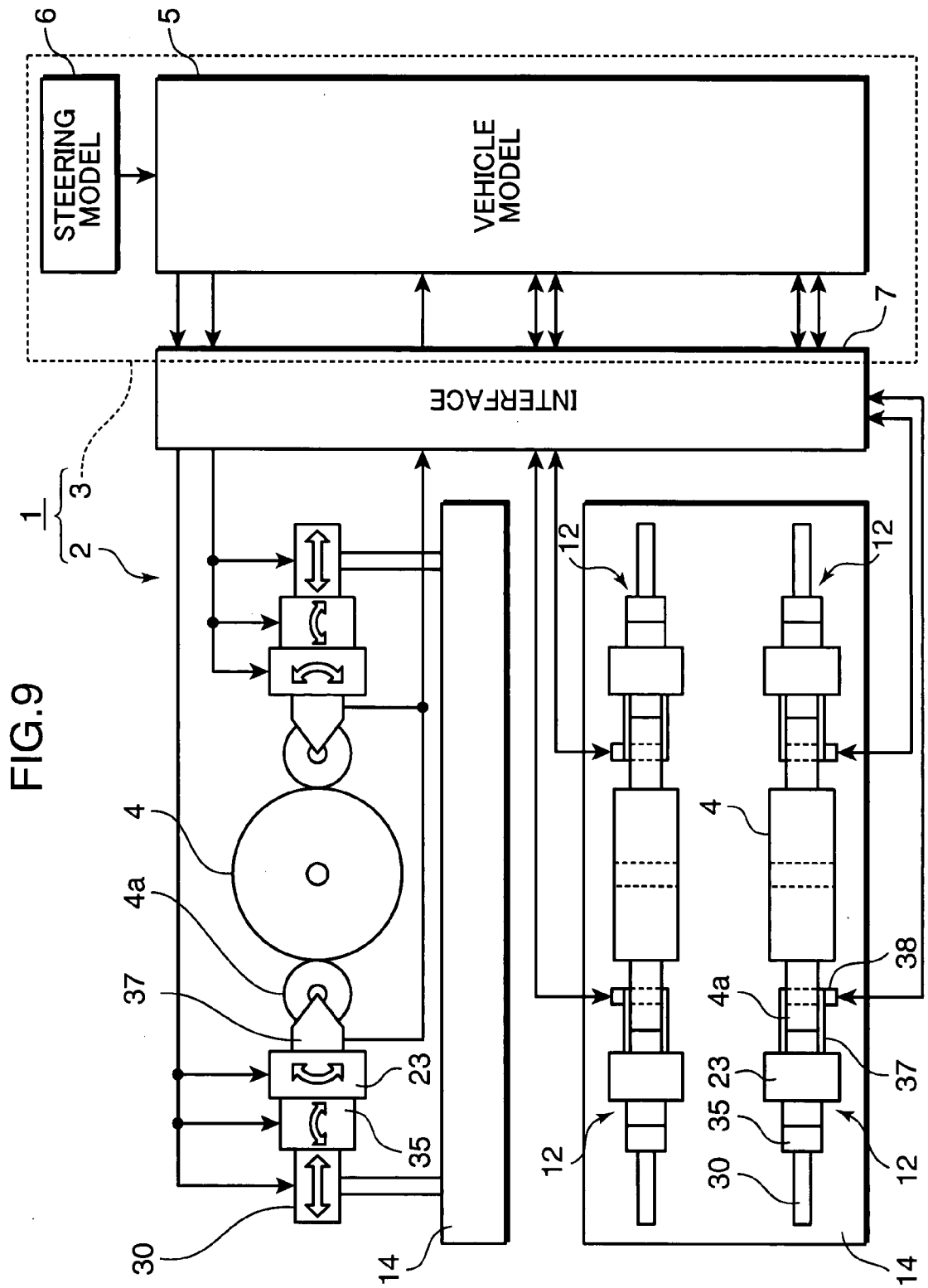
FIG. 9 is a schematic view of the tire HIL simulator according to the second embodiment of the present invention, showing its system configuration.

FIG. 8 and FIG. 9 show a second embodiment of the present invention. In this embodiment, as shown in FIG. 8, each tire attachment portion 12 described above is provided with a braking force actuator 38. This braking force actuator 38 is adapted for imparting a braking force to the tire 4a, and is connected to each tire 4a at a position near the side-force measuring device 37. As shown in FIG. 9, each tire attachment portion 12 is connected via the interface 7 to the vehicle model 5.

In this embodiment, braking forces to the front wheels and the rear wheels which are derived from the vehicle model 5 are inputted as command values in the braking force actuator 38 to thereby give the braking force derived from the vehicle model 5 to each tire 4a. Consequently, the vehicle model 5 is imparted with a rotational motion in the pitching direction, thus enabling to generate a simulation in which a braking force is given.

Figure 10:
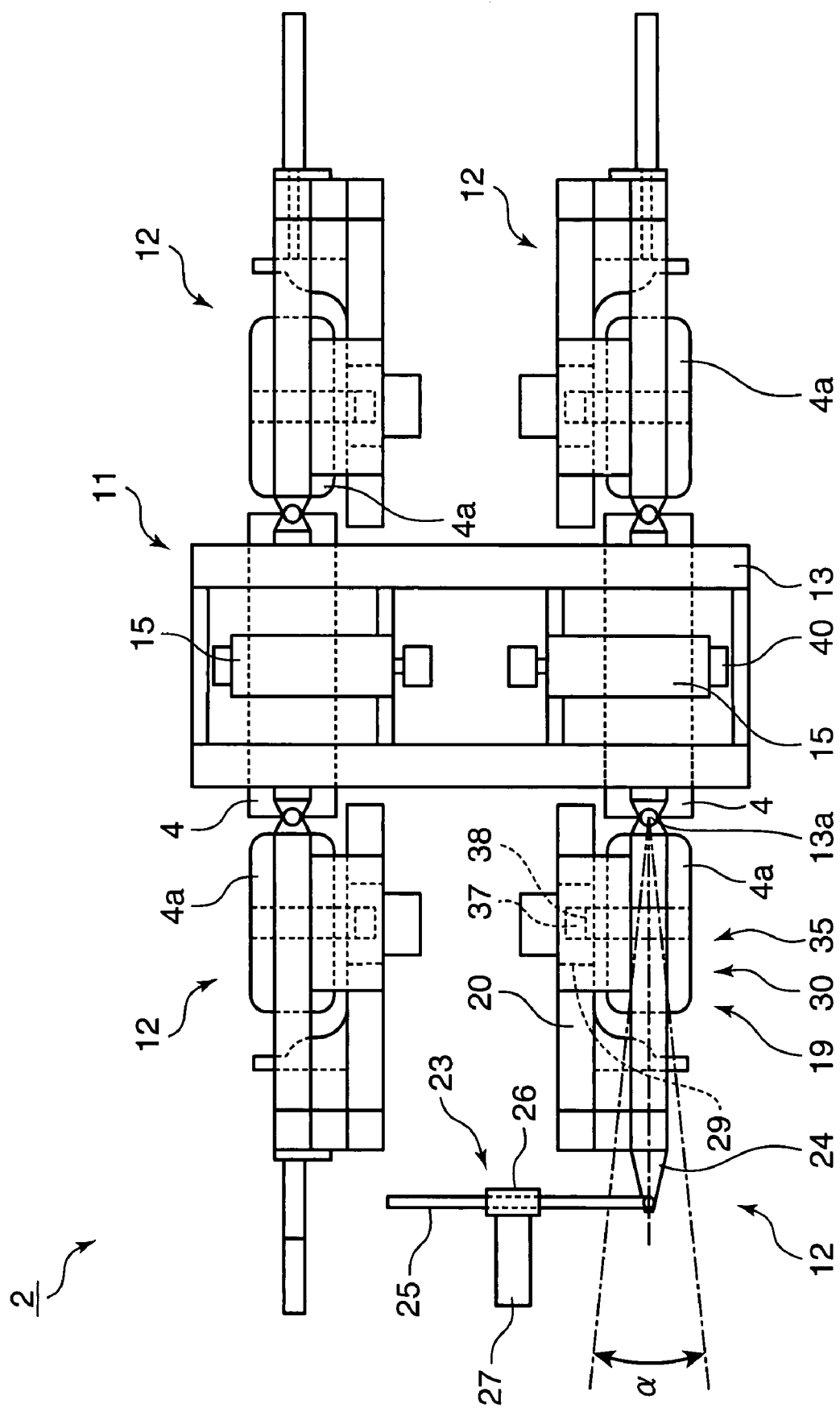
FIG. 10 is a plan view of a tire testing apparatus of a tire HIL simulator according to a third embodiment of the present invention.
Figure 11:
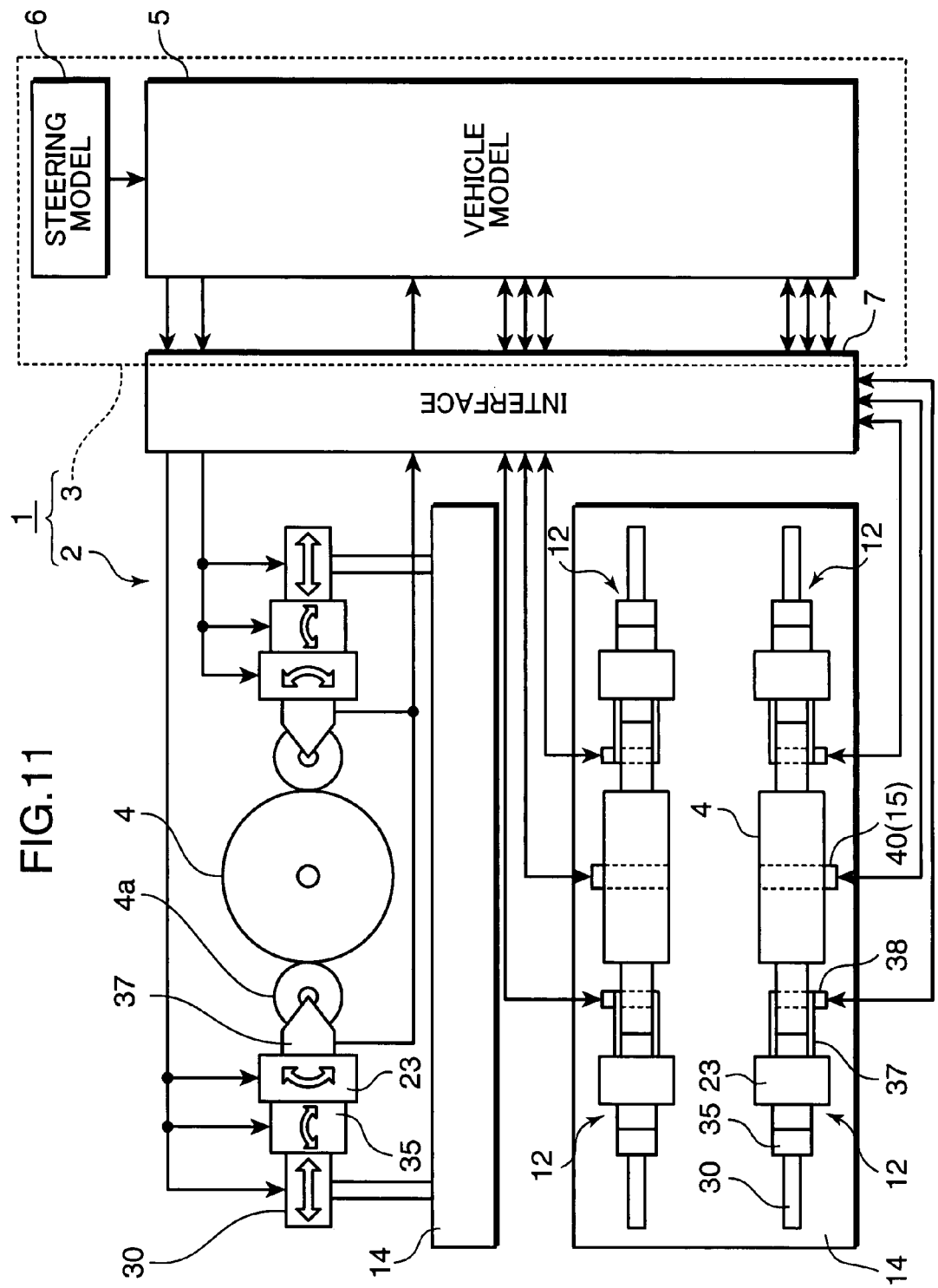
FIG. 11 is a schematic view of the tire HIL simulator according to the third embodiment of the present invention, showing its system configuration.

A third embodiment of the present invention is shown in FIG. 10 and FIG. 11. In this embodiment, as shown in FIG. 10, a drive unit 15 is provided with a speed detector 40 for detecting a speed at which the mimic road surface body 4 is driven. This speed detector 40 and the drive unit 15 are connected, as shown in FIG. 11, via the interface 7 to the vehicle model 5.

In this embodiment, since there is provided the means for measuring and controlling the drive speed of the mimic road surface body 4 (in the figure's example, the rotational speed of the drum which constitutes the mimic road surface body 4), the drive speed derived from the vehicle model 5 can be given to the mimic road surface body 4. This enables to generate a simulation in which the drive speed of the mimic road surface body 4 is changed.

Figure 12:
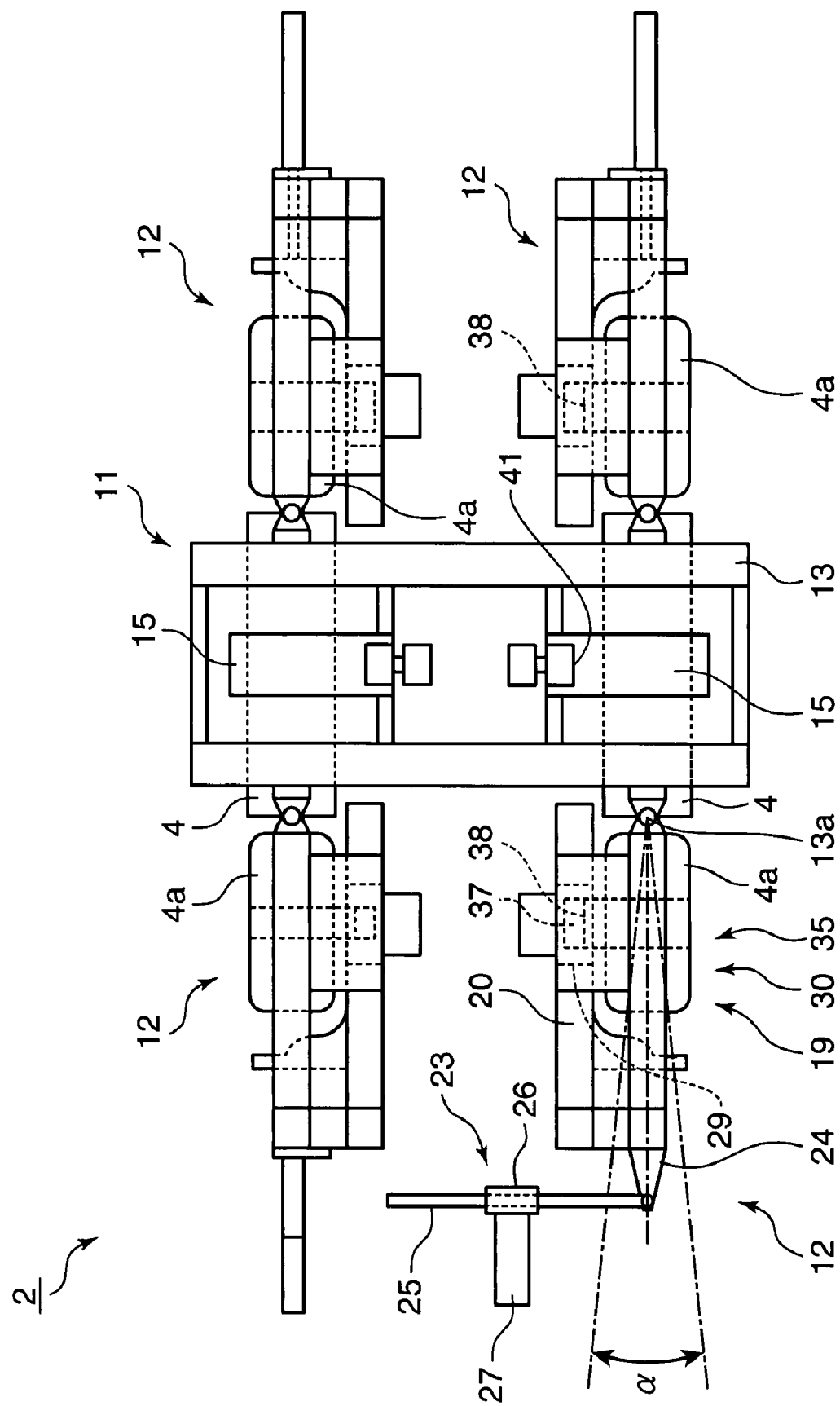
FIG. 12 is a plan view of a tire testing apparatus of a tire HIL simulator according to a fourth embodiment of the present invention.
Figure 13:
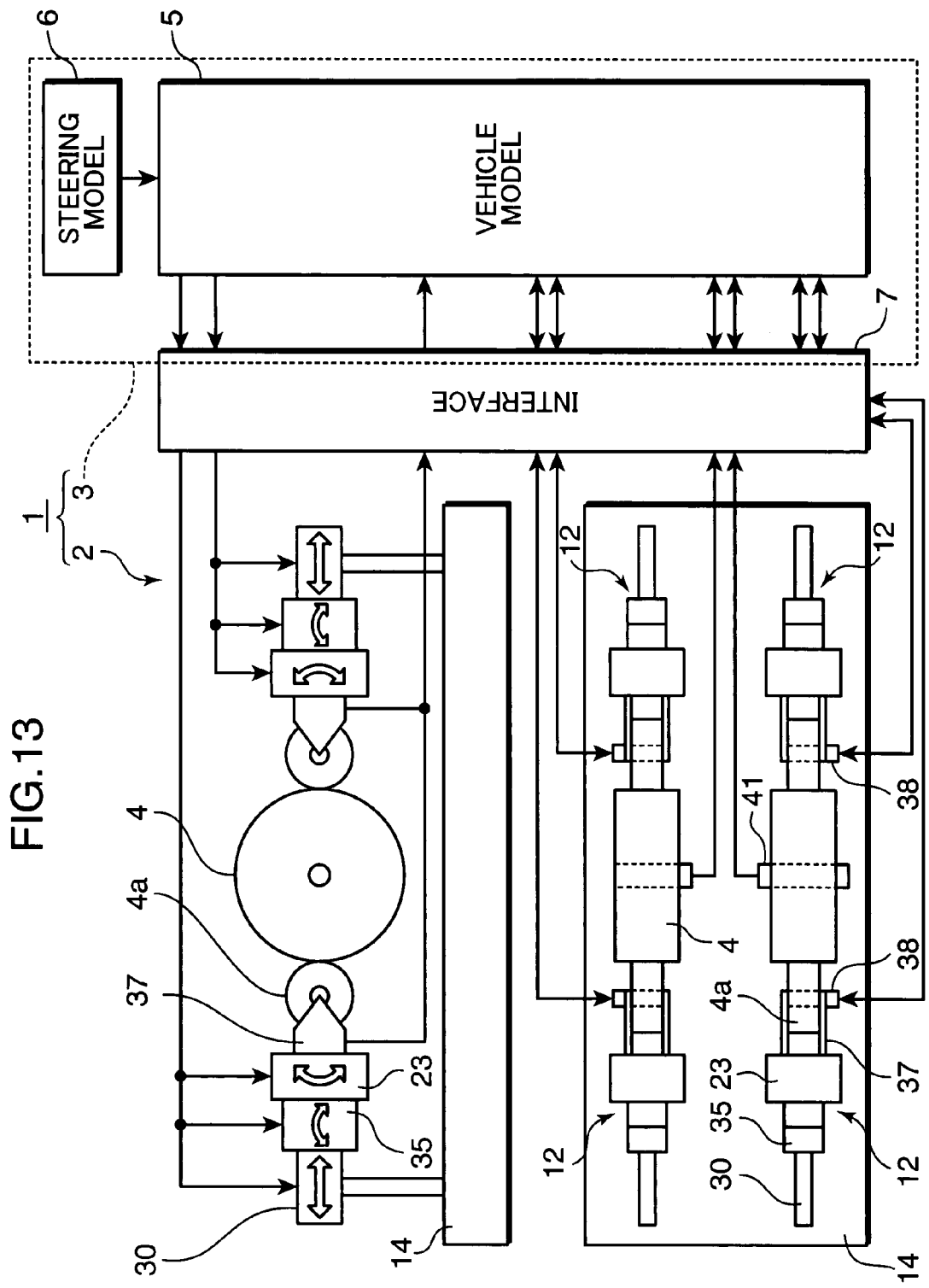
FIG. 13 is a schematic view of the tire HIL simulator according to the fourth embodiment of the present invention, showing its system configuration.

A fourth embodiment of the present invention is shown in FIG. 12 and FIG. 13. In this embodiment, as shown in FIG. 12, each drive unit 15 is provided with a driving torque detector 41 for detecting a torque by which the mimic road surface body 4 is driven. In this embodiment, a motor capable of controlling the rotational speed of the drum of the mimic road surface body 4 serves as the driving torque detector 41. As shown in FIG. 13, the driving torque detector 41 is connected via the interface 7 to the vehicle model 5. The vehicle model 5 has, as one of parameters, a rolling resistance which is derived based on a driving torque detection value outputted from the driving torque detector 41.

In this embodiment, a rolling resistance force is calculated based on the drum driving torque detected by the driving torque detector (or the motor) 41. This rolling resistance force is inputted in the vehicle model 5, thus enabling to generate a simulation in consideration of the effect of the rolling resistance.

Herein, in the calculation of the rolling resistance force, a driving torque of the drum motor is measured, and a rolling resistance is then calculated from a difference between a driving torque in a state where the tire 4a is not pressed onto the peripheral surface of the mimic road surface body 4 and a driving torque in a state where the tire 4a is pressed onto it. In short, a rolling resistance force $F_R$ is obtained from the following Equation (7).

[Number 7]

$$F_R = \frac{(T_2 - T_1)}{nr} \tag{7}$$

Wherein T1 denotes a drum driving torque in a state where the tire 4a is not pressed onto the peripheral surface of the mimic road surface body 4; T2 denotes a drum driving torque in a state where the tire 4a is pressed onto the peripheral surface of the mimic road surface body 4; $\underline{r}$ denotes a drum radius of the mimic road surface body 4; and $\underline{n}$ denotes the number of tires 4a in contact with one mimic road surface body 4, $\underline{n}$=2 in the case of FIG. 13.

Figure 14:
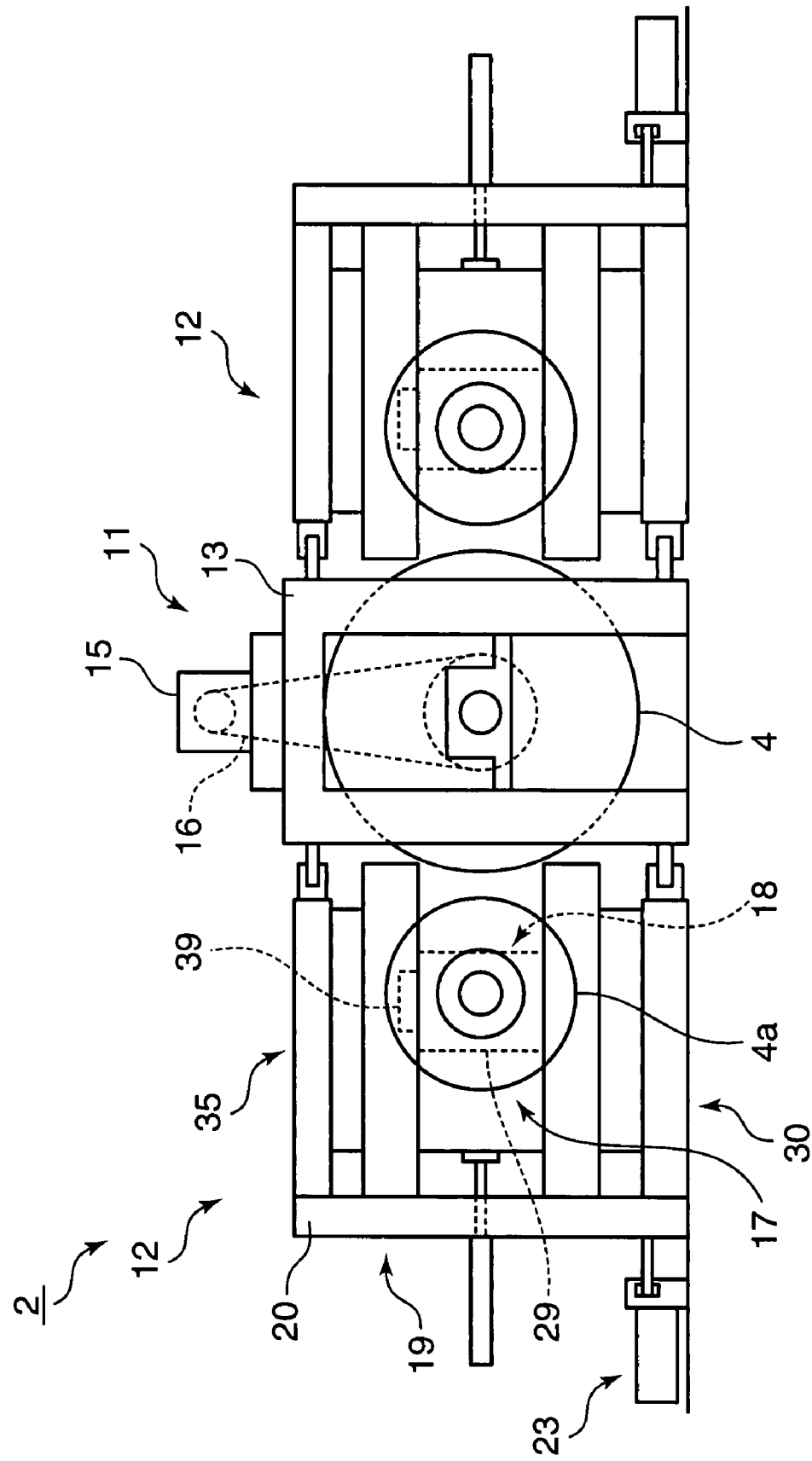
FIG. 14 is a plan view of a tire testing apparatus of a tire HIL simulator according to a fifth embodiment of the present invention.
Figure 15:
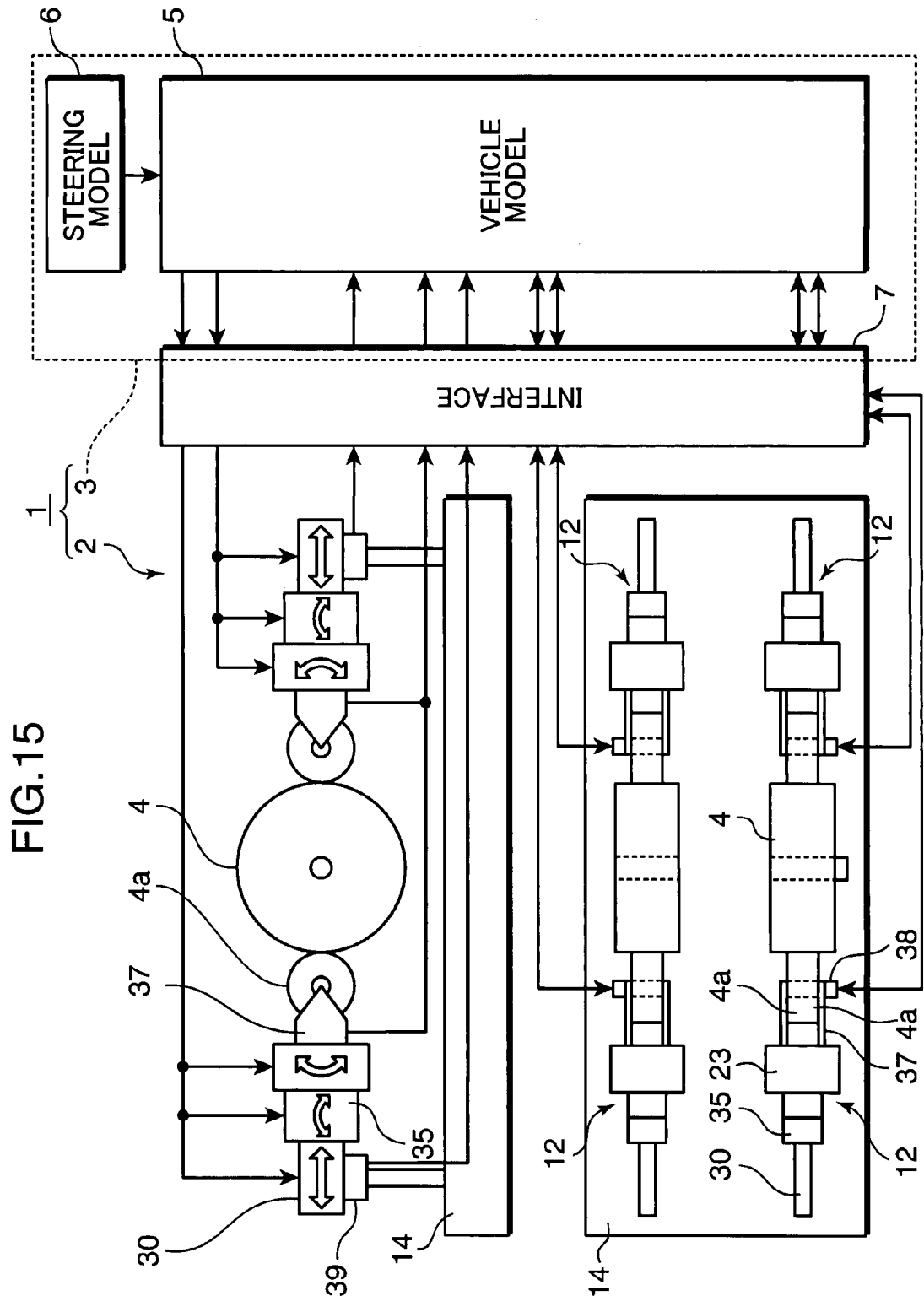
FIG. 15 is a schematic view of the tire HIL simulator according to the fifth embodiment of the present invention, showing its system configuration.
Figure 19:
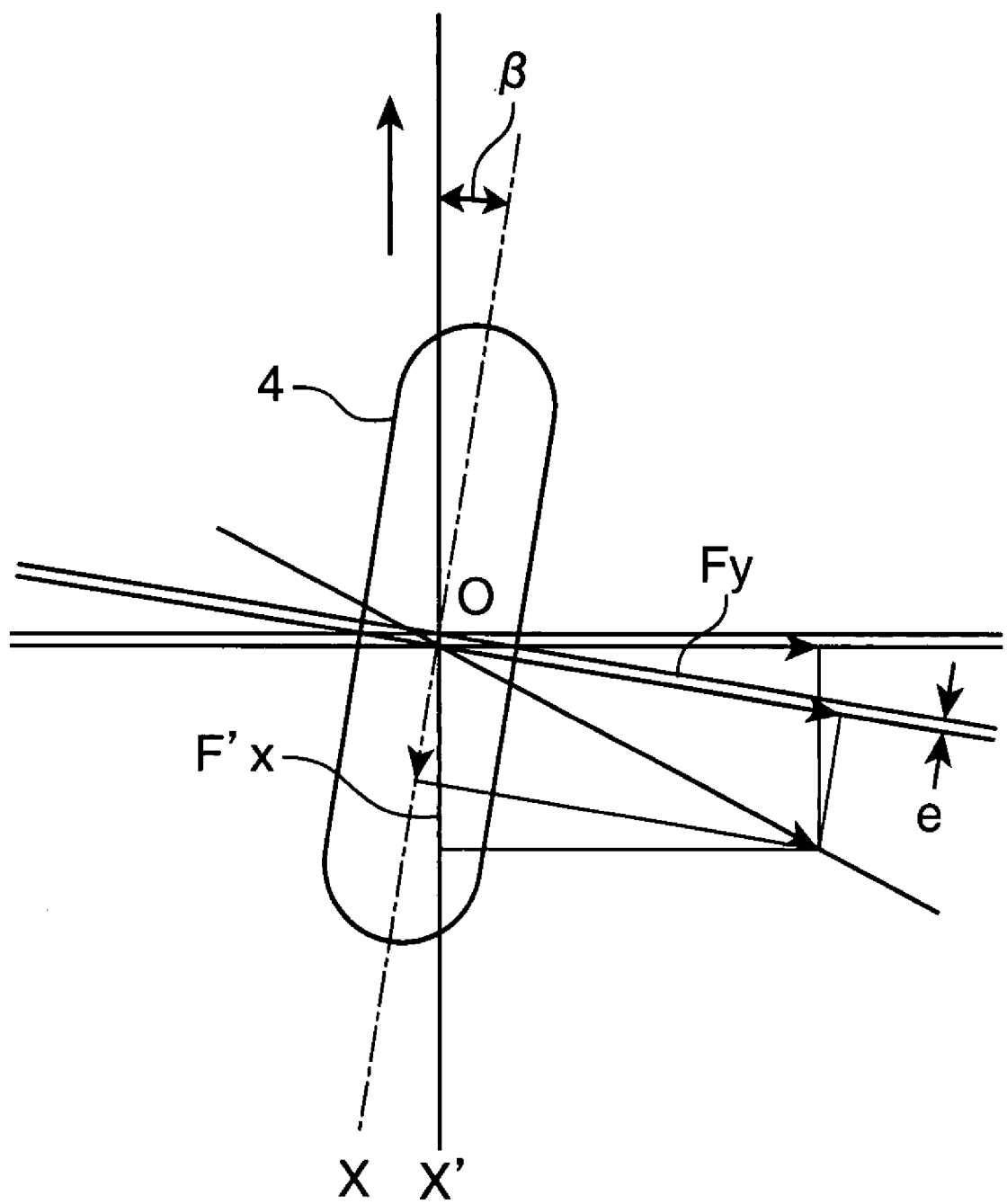
FIG. 19 is an illustration explaining the definition of terms used in the present invention.

A fifth embodiment of the present invention is shown in FIG. 14 and FIG. 15. In this embodiment, as shown in FIG. 14, a tractive load measuring device 39 is provided on an upper end of the slider 29 of each tire attachment portion 12. This tractive load measuring device 39 measures, as a tractive load (also called "traction load" or "driving force"), a tractive resistance force F'x (see FIG. 19) generating in the tire 4a when the mimic road surface body 4 is driven to rotate the tire 4a. The tractive load measuring device 39 is connected, as shown in FIG. 15, via the interface 7 to the vehicle model 5. The vehicle model 5 has a tractive load as one of the parameters.

In this embodiment, a tractive load detected by the tractive load measuring device 39 is inputted in the vehicle model 5, thus enabling to generate a simulation in consideration of the effect of a tractive load.

Figure 16:
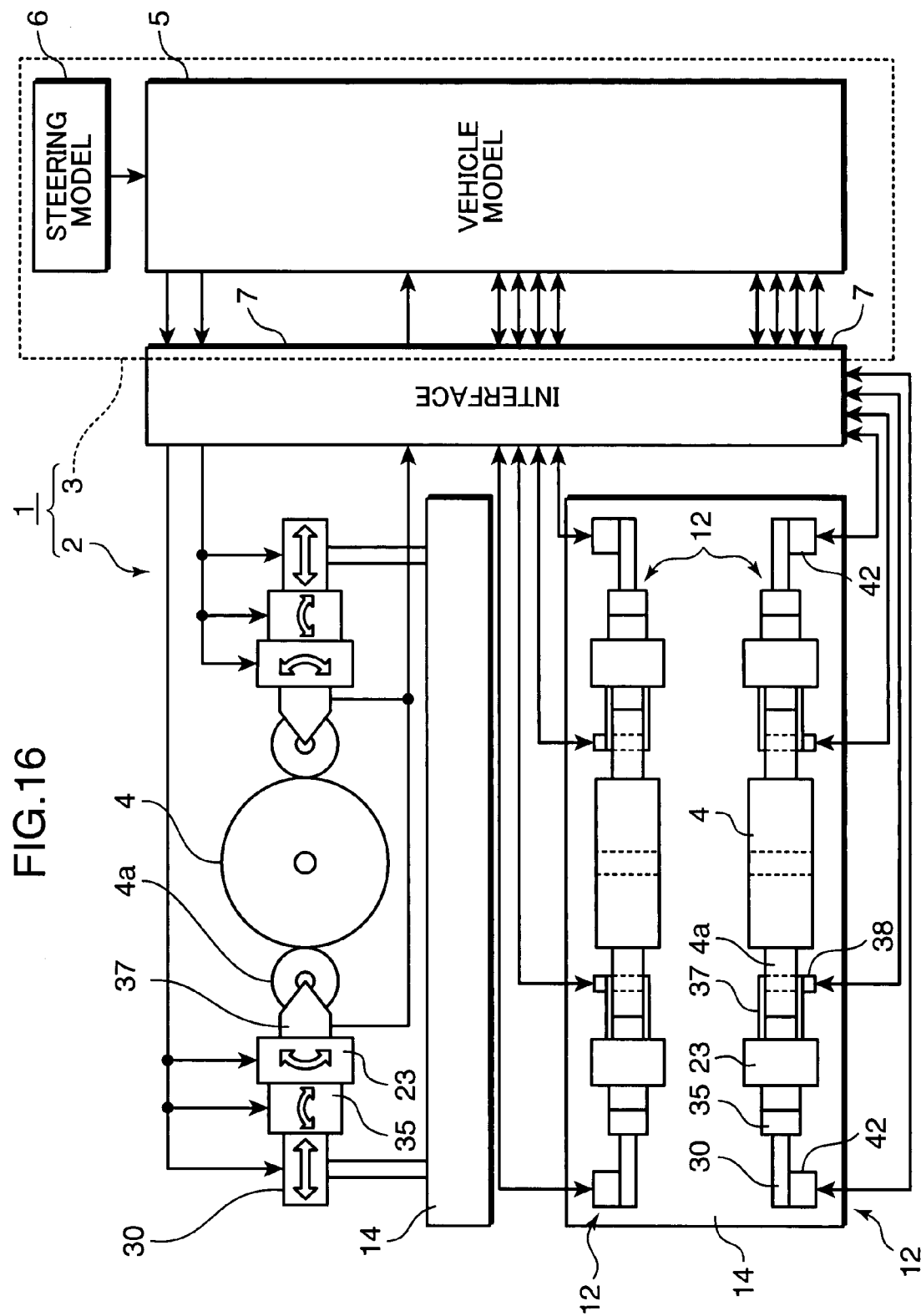
FIG. 16 is a schematic view of a tire HIL simulator according to a sixth embodiment of the present invention, showing its system configuration.

A sixth embodiment of the present invention is shown in FIG. 16. In this embodiment, each tire attachment portion 12 of the tire testing apparatus 2 is provided with a widthwise displacement actuator 42 for imparting a widthwise displacement to the tire 4a. This widthwise displacement actuator 42 is connected via the interface 7 to the vehicle model 5.

In this embodiment, a command value calculated using the vehicle model 5 is inputted in the widthwise displacement actuator 42 to generate a simulation in which each tire 4a is displaced in a widthwise direction.

Figure 17:
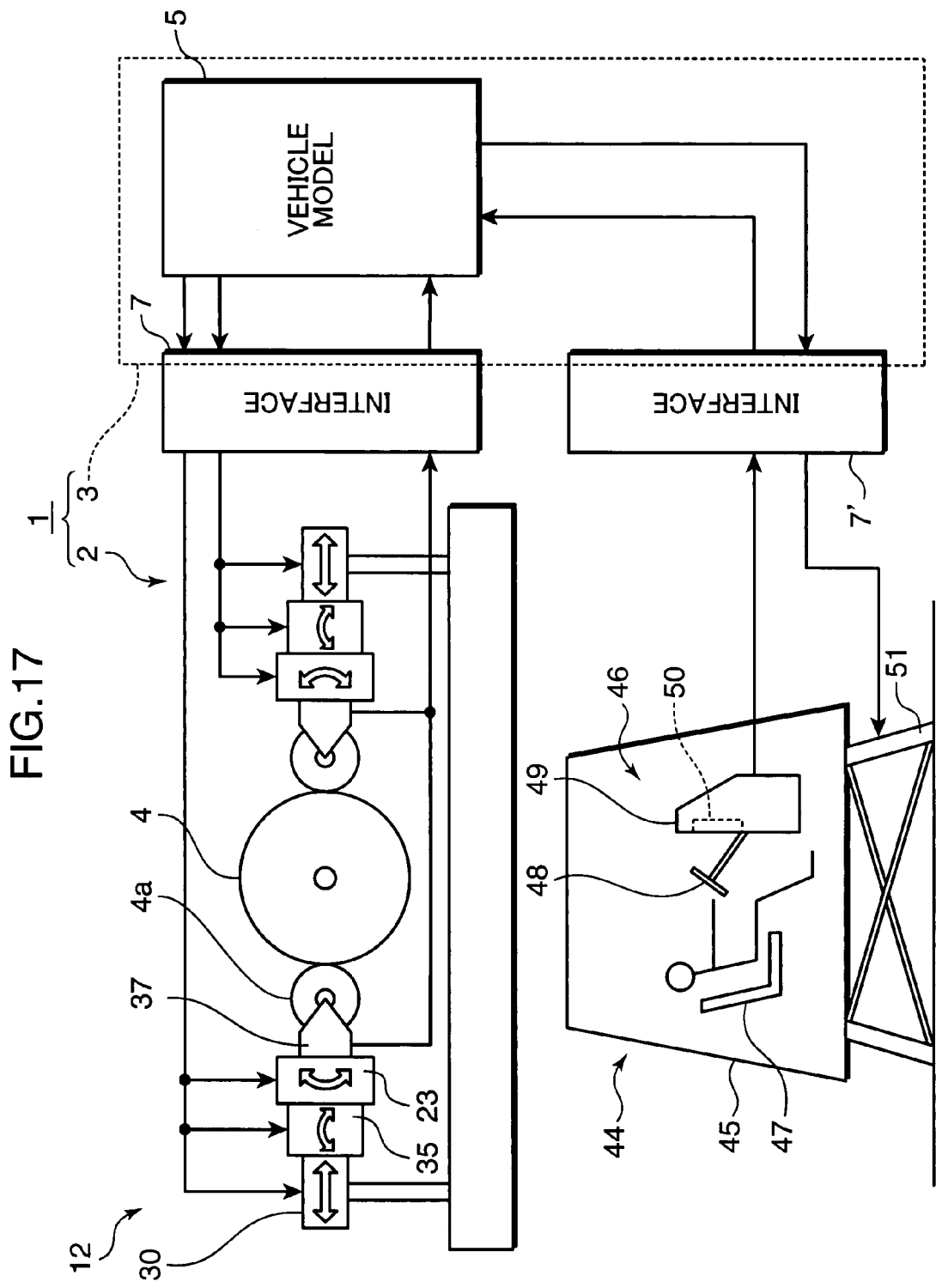
FIG. 17 is a schematic view of a tire HIL simulator according to a seventh embodiment of the present invention, showing its system configuration.
Figure 18:
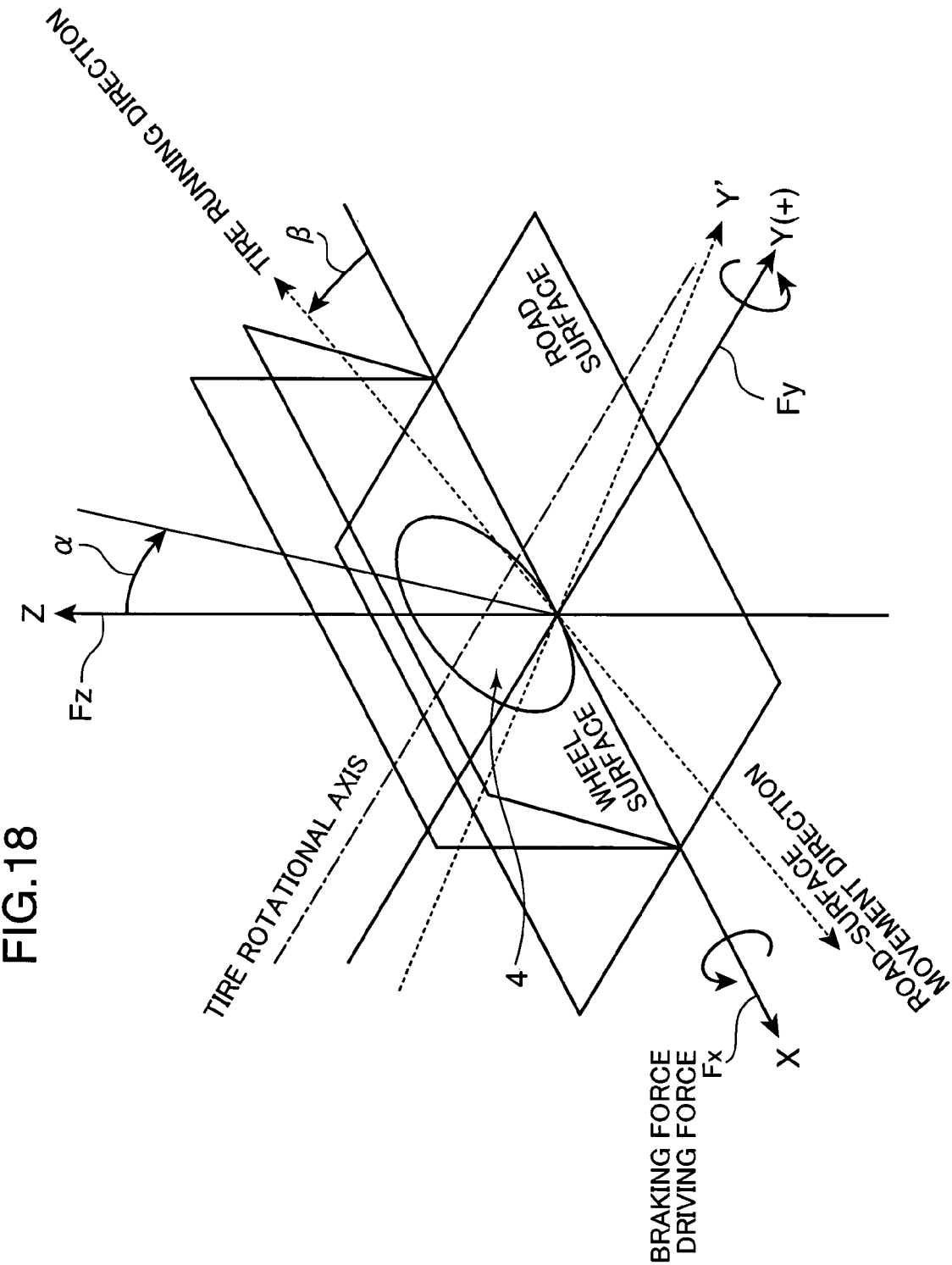
FIG. 18 is an illustration explaining the definition of terms used in the present invention.

FIG. 17 is a schematic view of a tire HIL simulator according to a seventh embodiment of the present invention, showing its system configuration. In this embodiment, a mimic driver seat unit 44 as well as the tire testing apparatus 2 are connected to the controller 3. The mimic driver seat unit 44 includes a driver cabin 46 enclosed with a frame member 45. The driver cabin 46 is provided with a seat 47 similar to that of a real vehicle, and a driving operation device 49 including a rotatable steering wheel 48, an accelerator pedal, a brake pedal, an instrument panel and the like.

The driving operation device 49 is provided with a display 50 for displaying a front view through a windshield or the like while driving a vehicle, and connected via an interface 7' to the controller 3 including the vehicle model 5. The driver cabin 46 is supported on a moving unit 51 driven by a hydraulic system or the like. The moving unit 51 is connected via the interface 7' to the controller 3, and designed to give the driver cabin 46 the same vehicle body motion as that of a rear running.

In this embodiment, the steering wheel 48 of the driving operation device 49 is operated, and an operated angle is taken as a steering angle for the vehicle model 5 into the computer of the controller 3. Further, a state quantity and a tire side force are also inputted in the controller 3. The controller 3 calculates a dynamic behavior of the vehicle using the vehicle model 5, and outputs a command value obtained from this calculation to the actuators of each tire attachment portion 12 of the tire testing apparatus 2 to control each tire 4a of the tire testing apparatus 2. At the same time, the command value corresponding to the vehicle's dynamic behavior is inputted from the controller 3 in the driving operation device 49 and the moving unit 51 to control the mimic driver seat unit 44 as well.

Therefore, according to this embodiment, a dynamic behavior of a vehicle running can be reproduced in a state extremely approximate to the real running test state.

The present invention is not limited to those given in the above described embodiments. For example, a tire testing apparatus 2 may provided with a braking force actuator 38, a speed detector 40, a driving torque detector 41, a tractive load measuring device 39, and a widthwise displacement actuator 42, and a mimic driver seat unit 44 connected to the controller 3. Moreover, it may be appreciated to provide some of these devices or units.

As described so far, according to the present invention, performance characteristics of a real tire are inputted in the vehicle model, and the motion characteristics of the vehicle that are obtained using the vehicle model affected by the inputted tire performance characteristics can be given, via each actuator, again to the real tire of the tire testing apparatus. Information exchange between the tire testing apparatus and the controller is executed in real time, thus enabling to generate a simulation which is extremely approximate to the real running test state.

The tire testing apparatus may be preferably designed to bear four tires, i.e., front right, front left, rear right, and rear left tires, simultaneously. In this case, preferably, the vehicle model may be a three-dimensional vehicle model for a four-wheel passenger vehicle having a suspension mechanism. According to this configuration, performance characteristics of the front right, front left, rear right and rear left tires can be individually measured as is the case with a four-wheel passenger. Furthermore, motion characteristics of the vehicle can be given to each of the four tires. Moreover, a simulation close to the real running test state can be realized. In addition, a three-dimensional vehicle model in consideration of suspension mechanisms may be adopted to calculate the motion characteristics of the vehicle taking into account a rotational motion in a pitching direction and a rolling direction as well as a yawing direction.

The tire testing apparatus may be preferably provided with a swing member capable of swinging in a direction that the camber angle varies with respect to the mimic road surface body. The swing member is adapted for supporting the tire and an actuator for imparting a contact load, and is connected with an actuator for swing the swing member to impart a camber angle. According to this configuration, the swing member is swung to produce a proper camber angle, and the contact load impartation actuator supported on the swing member is operated to allow the tire to come into contact with the mimic road surface body at the camber angle and a predetermined contact load.

It may be preferable that the tire testing apparatus is provided with a braking force actuator for imparting a braking force to the tire, and the vehicle model outputs a command value to the braking force actuator. According to this configuration, performance characteristics of the tire can be measured when a braking force works on the tire.

Furthermore, it may be preferable that the tire testing apparatus has a drive unit for driving the mimic road surface body, and the vehicle model outputs a command value to the drive unit. According to this configuration, the command value from the vehicle model is inputted in the drive unit so that performance characteristics of the tire can be measured when a change is made in the drive of the mimic road surface body.

Moreover, it may be preferable that the drive unit is provided with a driving torque detector, and the vehicle model has, as one of the parameters, a rolling resistance which is calculated based on the driving torque detected by the driving torque detector. This configuration enables calculating motion characteristics of the vehicle taking a rolling resistance into account. In the present invention, the rolling resistance is equivalent to a resistance force against the driving of the mimic road surface body in contact with the tire. The rolling resistance is proportional to a difference between a drive unit's driving torque in a state where the tire is pressed onto the mimic road surface body and a drive unit's driving torque in a state where the tire is not pressed onto it.

In addition, it may be preferable that the tire testing apparatus is provided with a tractive load measuring device for measuring a tractive load to the tire, and the vehicle model has a tractive load as one of the parameters. This configuration enables measuring performance characteristics of the tire taking the tractive load into account. In the present invention, the tractive load is a traction resistance force in a tire running time, and indicated by F'x in FIG. 19. Applying the traction resistance onto the tire varies the vehicle's running speed.

It may be preferable that the tire testing apparatus has a widthwise displacement actuator for imparting a widthwise displacement to the tire, and the vehicle model outputs a command value to the widthwise displacement actuator. This configuration allows the widthwise displacement calculated using the vehicle model of the controller to work on the tire of the tire testing apparatus, thus making it possible to measure performance characteristics of the tire when the widthwise displacement is given to the tire. The widthwise displacement according to the present invention is a displacement of the tire in a direction perpendicular to the tire running direction, corresponding to a side-slip.

Furthermore, in the tire HIL simulator according to the present invention, it is preferable that a mimic driver seat unit is connected to the controller. The mimic driver seat unit can realize a virtual running test.

In this case, the mimic driver seat unit may be provided with a steering wheel. An angle equivalent to an operation angle of the steering wheel is input as a steering angle in the controller. The mimic driver seat unit allows a user to conduct an operation which approximates to real driving such as rotating the steering wheel to input a desirable steering angle in the controller.

INDUSTRIAL APPLICABILITY

The present invention can be used in automobile related and tire related industries.

The invention claimed is:
1. A tire HIL simulator comprising:
a tire testing apparatus which allows a real tire to come into contact with a mimic road surface body to conduct a running test of the tire; and
a controller which has a vehicle model, and obtains measurement data from the tire testing apparatus as an input value and makes a predetermined calculation using the vehicle model, and outputs a command value based on a result of the calculation to an actuator of the tire testing apparatus, wherein the tire testing apparatus includes: a side force measuring device for measuring a tire side force applied to the tire; and actuators for imparting a contact load, a side-slip angle and a camber angle to the tire, respectively, and the controller obtains a steering angle and a tire side force from the side force measuring device as an input value, and calculates a three-dimensional motion of a vehicle using the vehicle model, and outputs command values as a contact load, a side-slip angle, and a camber angle to the respective actuators based on a result of the calculation.

2. The tire HIL simulator according to claim 1, wherein:
the tire testing apparatus is operable to bear front right, front left, rear right, and rear left vehicle tires simultaneously; and
the vehicle model is a three-dimensional vehicle model for a four-wheel passenger vehicle having a suspension mechanism.

3. The tire HIL simulator according to claim 1, further comprising a swing member operable to swing in a direction of the camber angle varying, wherein:
the tire and the actuator for imparting a contact load are supported on the swing member; and
the actuator for imparting a camber angle is connected to the swing member to swing the swing member.

4. The tire HIL simulator according to claim 1, wherein:
the tire testing apparatus has a braking force actuator for imparting a braking force to the tire; and
the controller calculates using the vehicle model a command value to output to the braking force actuator.

5. The tire HIL simulator according to claim 1, wherein:
the tire testing apparatus has a drive unit which drives the mimic road surface body; and
the vehicle model outputs a command value to the drive unit.

6. The tire HIL simulator according to claim 5, wherein:
the drive unit has a driving torque detector for detecting a driving torque of the drive unit; and
the vehicle model has, as one of parameters, a rolling resistance which is calculated based on a driving torque detected by the driving torque detector.

7. The tire HIL simulator according to claim 1, wherein:
the tire testing apparatus has a tractive load measuring device which measures a tractive load to the tire; and
the vehicle model has a tractive load as one of parameters.

8. The tire HIL simulator according to claim 1, wherein:
the tire testing apparatus has a widthwise displacement actuator which imparts a widthwise displacement to the tire; and
the vehicle model outputs a command value to the widthwise displacement actuator.

9. The tire HIL simulator according to claim 1, further comprising a mimic driver seat unit connected to the controller.

10. The tire HIL simulator according to claim 9, wherein the mimic driver seat unit includes a steering wheel, and an angle equivalent to an operation angle of the steering wheel is input in the controller as a steering angle.

* * * * *